(12) United States Patent
Inoue et al.

(10) Patent No.: US 8,467,544 B2
(45) Date of Patent: Jun. 18, 2013

(54) FILTER COEFFICIENT SETTING DEVICE AND ECHO PREVENTION DEVICE

(75) Inventors: Takeo Inoue, Hirakata (JP); Hideki Ohashi, Kyoto (JP)

(73) Assignees: Semiconductor Components Industries, LLC, Phoenix, AZ (US); Sanyo Semiconductor Co., Ltd., Gunma (JP)

( * ) Notice: Subject to any disclaimer, the term of this patent is extended or adjusted under 35 U.S.C. 154(b) by 1436 days.

(21) Appl. No.: 11/968,605

(22) Filed: Jan. 2, 2008

(65) Prior Publication Data

US 2008/0181421 A1 Jul. 31, 2008

(30) Foreign Application Priority Data

Jan. 12, 2007 (JP) ................. 2007-004814
Feb. 28, 2007 (JP) ................. 2007-050337
Mar. 8, 2007 (JP) ................. 2007-058962

(51) Int. Cl.
*H04B 15/00* (2006.01)
*H04B 3/20* (2006.01)
*H04M 9/08* (2006.01)

(52) U.S. Cl.
USPC ............. 381/94.1; 379/406.04; 379/406.06; 381/66

(58) Field of Classification Search
USPC .............. 381/66, 61, 63, 93, 94.1, 94.3; 379/406.01–406.16; 370/282–286
See application file for complete search history.

(56) References Cited

U.S. PATENT DOCUMENTS

| 5,884,194 | A | * | 3/1999 | Shiraki ........................ 455/570 |
| 6,434,110 | B1 | * | 8/2002 | Hemkumar .................. 370/201 |
| 7,003,099 | B1 | | 2/2006 | Zhang |
| 2002/0085653 | A1 | * | 7/2002 | Matsuoka et al. ............ 375/347 |
| 2003/0174661 | A1 | * | 9/2003 | Lee .............................. 370/286 |
| 2004/0170271 | A1 | * | 9/2004 | Kubota ..................... 379/406.01 |
| 2006/0218214 | A1 | | 9/2006 | Ohashi |
| 2006/0218215 | A1 | * | 9/2006 | Ohashi et al. ................ 708/300 |
| 2006/0221876 | A1 | * | 10/2006 | Kosanovic et al. ........... 370/286 |

FOREIGN PATENT DOCUMENTS

| EP | 1830550 | | 9/2007 |
| GB | 2330745 | A | 4/1999 |
| JP | 2004-282434 | | 10/2004 |
| JP | 2006-304260 | | 11/2006 |
| WO | WO 2006/111370 | | 10/2006 |

OTHER PUBLICATIONS

Japanese Patent Publication No. 2006-304260, Publication Date Nov. 2, 2006 (English Translation).
European Patent Office, Extended European Search Report for application No. 08150199.1-1246, Mail date May 18, 2010.

* cited by examiner

*Primary Examiner* — Matthew Landau
*Assistant Examiner* — Khaja Ahmad
(74) *Attorney, Agent, or Firm* — SoCal IP Law Group LLP; Steven C. Sereboff; John E. Gunther

(57) ABSTRACT

A filter coefficient setting device for setting a filter coefficient of an echo prevention device including a first FIR filter, and a second FIR filter, comprises: a filter coefficient initial setting portion configured to set a predetermined filter coefficient for the first and second FIR filters when the echo prevention device is started.

11 Claims, 11 Drawing Sheets

US 8,467,544 B2

FILTER COEFFICIENT SETTING DEVICE AND ECHO PREVENTION DEVICE

CROSS-REFERENCE TO RELATED APPLICATION

This application claims the benefit of priority to Japanese Patent Application Nos. 2007-004814, 2007-050337 and 2007-058962, filed Jan. 12, 2007, Feb. 28, 2007 and Mar. 8, 2007, respectively, of which full contents are incorporated herein by reference.

BACKGROUND OF THE INVENTION

1. Field of the Invention

The present invention relates to a filter coefficient setting device and an echo prevention device.

2. Description of the Related Art

Recently, some communication devices such as cellular phones and hands-free phones to which an earphone-microphone are connected incorporate an echo prevention device in order to prevent an echo generated by acoustic coupling traveling from a speaker to the microphone or electric reflection or the like on a circuit.

For example, Japanese Patent Laid-Open No. 2006-304260 discloses an echo prevention device which cancels an echo with high accuracy using digital processing. FIG. 13 is an example of the echo prevention device using a DSP 100. As shown in the figure, an analog signal indicating sound transmitted from the other party over a cell phone or the like is inputted to an AD converter 101. And the signal digital-converted by the AD converter 101 is given convolution processing based on respective filter coefficients by FIR filters 102, 103 in the DSP 100 and outputted. The signal outputted from the FIR filter 102 is inputted to a DA converter 104. And the signal analog-converted by the DA converter 104 is outputted to an earphone-microphone through an input/output terminal 105 and inputted to one of terminals of a differential amplifier circuit 106. The signal outputted from the FIR filter 103 is inputted to a DA converter 107. The signal outputted from the DA converter 107 is inputted to the other terminal of the differential amplifier circuit 106. And the signal outputted from the differential amplifier circuit 106 is converted to a digital signal by an AD converter 108 and inputted to the DSP 100.

Here, the DSP 100 obtains an impulse response from the DA converter 104 to the AD converter 108 by an output of the AD converter 108 when an impulse is outputted to the DA converter 104. Also, the DSP 100 obtains an impulse response from the DA converter 107 to the AD converter 108 by an output of the AD converter 108 when an impulse is outputted to the DA converter 107. And by appropriately setting the filter coefficients of the FIR filters 102, 103 based on these impulse responses, an echo by the signal inputted to the AD converter 101 can be removed by the differential amplifier circuit 106.

From the signal outputted from the AD converter 108, an output signal of an adaptive filter 111 is subtracted at a subtraction portion 110 in the DSP 100 and outputted. This adaptive filter 111 removes the echo which can not be fully removed by the differential amplifier circuit 106 by adaptively changing the filter coefficient so that the output signal from the subtraction portion 110 falls under a predetermined level while a sound signal is being transmitted from the other party. And the digital signal outputted from the subtraction portion 110 is converted to an analog signal at a DA converter 109, after being outputted from the DSP 100, and outputted as an output signal of the echo prevention device.

When the echo prevention device is started, the filter coefficients of the FIR filters 102, 103 are undefined values. Therefore, during the period till the impulse response is obtained upon instruction by a user and an appropriate filter coefficient is set for the FIR filters 102, 103, the echo is not cancelled but an unpleasant echo is transmitted to the other party. Moreover, since the user of the echo prevention device can not recognize that the discomfort echo is being transmitted to the other party, the user does not notice that he should instruct the echo prevention device to obtain the impulse response. Therefore, the unpleasant echo might be continuously transmitted to the other party.

Also, in the echo prevention device, the echo is further removed in the DSP 100 after the echo is removed in the differential amplifier circuit 106. For example, if the impulse response can not be obtained with high accuracy due to an influence of an electric noise, an ambient noise of the earphone-microphone wearer, or the like, the echo can not be sufficiently removed in the differential amplifier circuit 106 in some cases. In this case, by operation of the subtraction portion 110 and the adaptive filter 111 in the DSP 100, the echo which could not be removed by the differential amplifier circuit 106 is effectively removed. However, if the echo has been sufficiently removed by the differential amplifier circuit 106, the echo might be increased to the contrary by the operation of the subtraction portion 110 and the adaptive filter 111.

In the echo prevention device, the echo might be further removed in the DSP 100 after the echo has been removed by the differential amplifier circuit 106, but the echo is not completely removed but might remain in some cases. However, the talker on the other side does not feel a sense of discomfort with the echo returning substantially at the same time as uttering.

In the echo prevention device, a signal transmitted to the other party might be superimposed by a large noise due to an influence of a noise from an earphone-microphone 20 or an electric noise or the like in the circuit. As means to remove such a noise, the signal outputted from the subtraction portion 110 can be outputted through a noise canceller.

However, the noise canceller generally accumulates inputted data to some extent and then, outputs it with noise cancellation processing to the accumulated data, and a delay might occur according to the accumulated amount and the processed amount. Thus, even if the echo included in the signal outputted from the subtraction portion 110 is slight, the talker on the other side hears the echo with some delay after uttering, which causes a sense of discomfort.

SUMMARY OF THE INVENTION

A filter coefficient setting device for setting a filter coefficient of an echo prevention device including a first FIR filter configured to be inputted with a first digital signal and to output a second digital signal, a second FIR filter configured to be inputted with the first digital signal along with the input thereof to the first FIR filter and to output a third digital signal, a first DA converter configured to convert the second digital signal to a first analog signal to be output, a second DA converter configured to convert the third digital signal to a second analog signal to be output, an input/output terminal configured to output the first analog signal or to be inputted with a third analog signal, a subtraction portion configured to output a fourth analog signal obtained by subtracting the second analog signal from a signal obtained by combining the first analog signal and the third analog signal, and an AD converter configured to convert the fourth analog signal outputted from the subtraction portion to a digital signal to be output, comprises: a filter coefficient initial setting portion configured to set a predetermined filter coefficient for the first and second FIR filters when the echo prevention device is started; a response signal obtaining portion configured to obtain a first response signal from output of the first FIR filter to output of the AD converter by generating a first signal, and to obtain a second response signal from output of the second FIR filter to output of the AD converter by generating a second signal; and a filter coefficient setting portion configured to set a filter coefficient based on the first response signal for the second FIR filter and a filter coefficient based on the second response signal for the first FIR filter, in order that the fourth analog signal is a signal obtained by removing or attenuating the first analog signal in a signal obtained by combining the first analog signal and the third analog signal.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

First Embodiment

Entire Configuration

Figure 1:
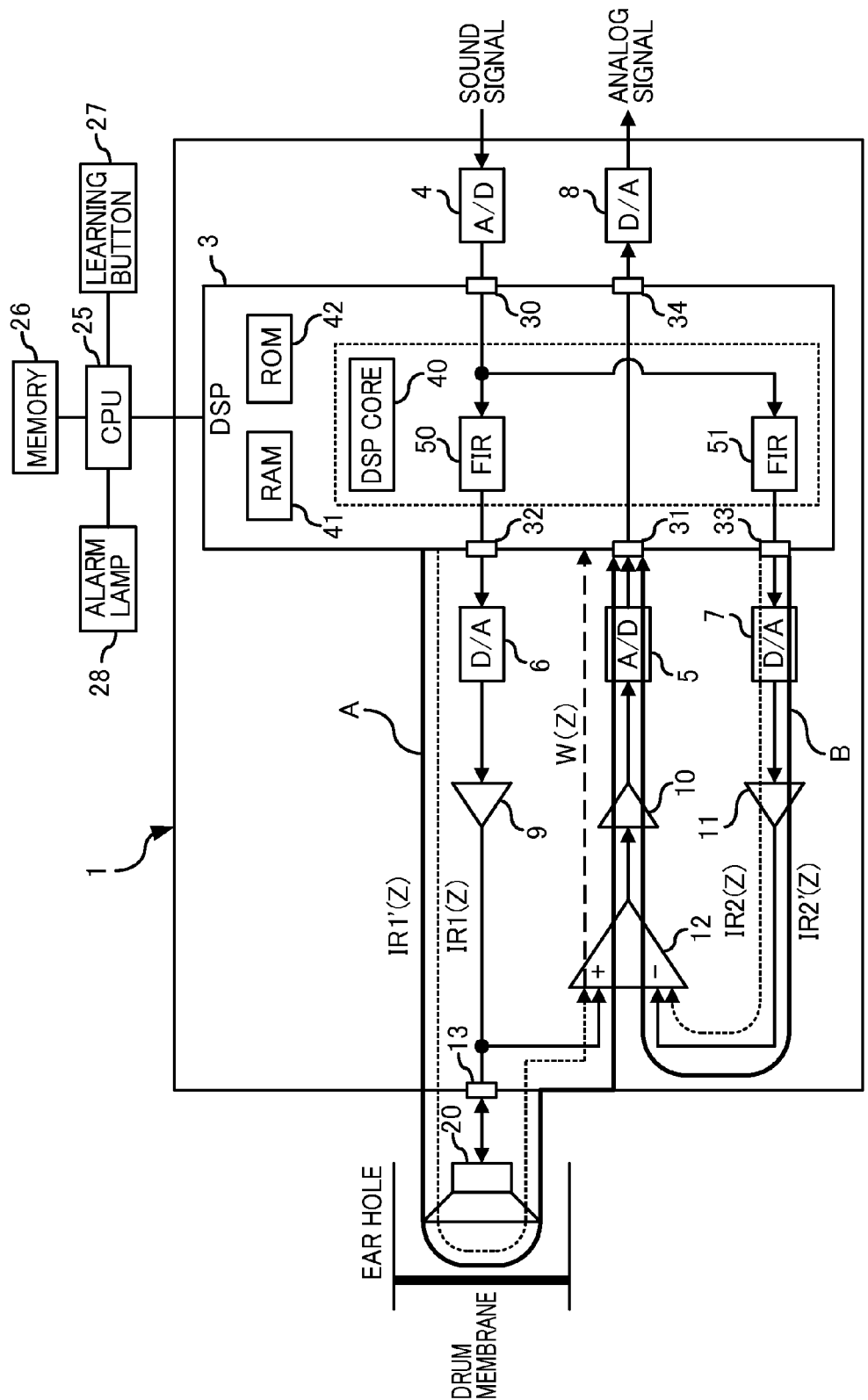
FIG. 1 is a block diagram illustrating an example of an echo prevention device to which the present invention is applied.

FIG. 1 is a block diagram illustrating an example of an echo prevention device to which the present invention is applied.

An echo prevention device 1 comprises a digital signal processing circuit (DSP: Digital Signal Processor) 3, AD converters 4, 5, DA converters 6 to 8, amplifier circuits 9 to 11, differential amplifier circuits 12, and an input/output terminal 13. Outside the echo prevention device 1, an earphone-microphone 20 and a CPU (Central Processing Unit) 25, a memory 26, a learning button 27, and an alarm lamp 28 are provided. The DA converter 6 corresponds to a first DA converter of the present invention, and the DA converter 7 corresponds to the second DA converter of the present invention. The differential amplifier circuit 12 corresponds to a subtraction portion of the present invention.

The earphone-microphone 20 has a speaker function to generate sound by vibrating a vibrating plate (not shown) based on a sound signal inputted from the input/output terminal 13. The earphone-microphone 20 also has a mike function for generating a sound signal by converting vibration of a drum membrane to vibration of a vibrating plate when a person wearing the earphone-microphone 20 utters sound. The earphone-microphone 20 is a known art and described in Japanese Patent Laid-Open No. 2003-9272, for example. The sound signal generated by the earphone-microphone 20 (third analog signal) is inputted to the echo prevention device 1 through the input/output terminal 13. Also, a signal outputted to the earphone-microphone 20 through the input/output terminal 13 is reflected and inputted to the echo prevention device 1 through the input/output terminal 13. Here, the reflected signal includes a signal returning through the earphone-microphone 20 or a signal generated when sound outputted from the earphone-microphone 20 is reflected in the ear and the reflected sound is converted to a sound signal by the earphone-microphone 20. The input/output terminal 13 does not exclusively input/output an output signal or input signal. For example, the input/output terminal 13 may input/output the output signal and the input signal at the same time.

A CPU 25 commands and controls the echo prevention device 1 by executing a program stored in a memory 26. For example, when power-on to operate the echo prevention device 1 is detected, the CPU 25 outputs an instruction signal for executing a filter coefficient setting processing, which will be described later, to the DSP 3. Also, when a reset signal for resetting the echo prevention device 1 is inputted, for example, the CPU 25 can be configured to output the above instruction signal to the DSP 3.

Figure 2:
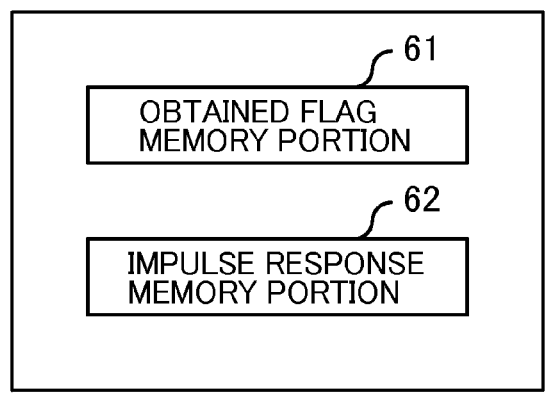
FIG. 2 is a diagram illustrating a part of memory portion provided at a memory.

The memory 26 is a non-volatile and rewritable storage region such as a flash memory, which is one type of EEPROM (Electronically Erasable and Programmable Read Only Memory), and stores various data required for control of the echo prevention device 1 in addition to the program to be executed by the CPU 25. FIG. 2 is a diagram illustrating a part of a storage portion provided at the memory 26. In the memory 26, an obtained flag memory portion 61 and an impulse response memory portion 62 are provided. The obtained flag memory portion 61 stores obtained flags indicating if an impulse response, which will be described later, has been already obtained or not by the echo prevention device 1. In the first embodiment, "1" is set to the obtained flag when the impulse response has been already obtained, while "0" is set to the obtained flag when the impulse response has not been obtained yet. In the impulse response memory portion 62, data according to the impulse response obtained in the echo prevention device 1 is stored.

A learning button 27 transmits an instruction to have the impulse response obtained by the echo prevention device 1 to the CPU 25.

An alarm lamp 28 is a light emitting device configured by an LED (Light Emitting Diode) or the like and lighted or flashed by control of the CPU 25. For example, if the impulse response has not been obtained in the echo prevention device 1, the alarm lamp 28 may be configured to be lighted so as to promote obtainment of the impulse response. The alarm lamp 28 is not limited for giving an alarm when the impulse response has not been obtained but can be also used for notification of receiving of phone or text mail.

The DSP 3 comprises input terminals 30, 31, output terminals 32 to 34, a DSP core 40, a RAM (Random Access Memory) 41, and a ROM (Read Only Memory) 42. The DSP 3 is also provided with FIR filters 50, 51. The FIR filters 50, 51 are realized when the DSP core 40 executes a program stored in the RAM 41 or the ROM 42. Filter coefficients of the FIR filters 50, 51 are stored in the RAM 41. Here, the FIR filter 50 corresponds to a first FIR filter in the present invention and the FIR filter 51 to a second FIR filter of the present invention. The FIR filters 50, 51 can be realized by hardware.

To the AD converter 4, a sound signal, for example, is inputted. And the AD converter 4 inputs a digital signal (first digital signal) obtained by analog-digital conversion processing of a sound signal to the DSP 3 through the input terminal 30.

The digital signal inputted to the DSP 3 is inputted to the FIR filters 50, 51, respectively. The FIR filter 50 outputs a digital signal (second digital signal: first input signal) obtained by applying convolution operation processing to the inputted digital signal (third input signal) based on the filter coefficient of the FIR filter 50 to the output terminal 32. At the same time, the FIR filter 51 outputs a digital signal (third digital signal: first output signal) obtained by applying the convulsion operation processing to the inputted digital signal (third input signal) based on the filter coefficient of the FIR filter 51 to the output terminal 33.

To the DA converter 6, an output signal from the FIR filter 50 is inputted through the output terminal 32. And the DA converter 6 outputs an analog signal (first analog signal) obtained by digital – analog conversion processing of the output signal from the FIR filter 50 to an amplifier circuit 9. The amplifier circuit 9 amplifies the analog signal by a predetermined amplification rate and outputs it.

To the DA converter 7, an output signal from the FIR filter 51 is inputted through the output terminal 33. And the DA converter 7 outputs an analog signal (second analog signal) obtained by digital-analog conversion processing of the output signal from the FIR filter 51 to an amplifier circuit 11. The amplifier circuit 11 amplifies the analog signal by a predetermined amplification rate and outputs it to a – input terminal of the differential amplifier circuit 12.

By outputting a signal (fourth analog signal) obtained by amplifying a difference between the analog signal inputted to a + input terminal and the analog signal inputted to the – input terminal, the differential amplifier circuit 12 removes or attenuates a signal (echo) in which the output signal of the amplifier circuit 9 is combined with a signal, which is the output signal of the amplifier circuit 9 is reflected through the earphone-microphone 20 and returned at the differential amplifier circuit 12 using the output signal of the amplifier circuit 11. If the echo can not be completely removed in the differential amplifier circuit 12, a signal including the attenuated echo is outputted. Here, the signal including the attenuated echo refers to a signal in which the echo is not fully removed but the signal level of the echo is lowered.

The AD converter 5 inputs a digital signal obtained by analog-digital conversion processing of the analog signal from the amplifier circuit 10 to the DSP 3 through the input terminal 31. The digital signal inputted to the input terminal 31 is outputted from the output terminal 34. To the DA converter 8, a digital signal outputted from the DSP 3 through the output terminal 34 is inputted. And the DA converter 8 outputs an analog signal obtained by digital-analog conversion processing of the digital signal.

Figure 3:
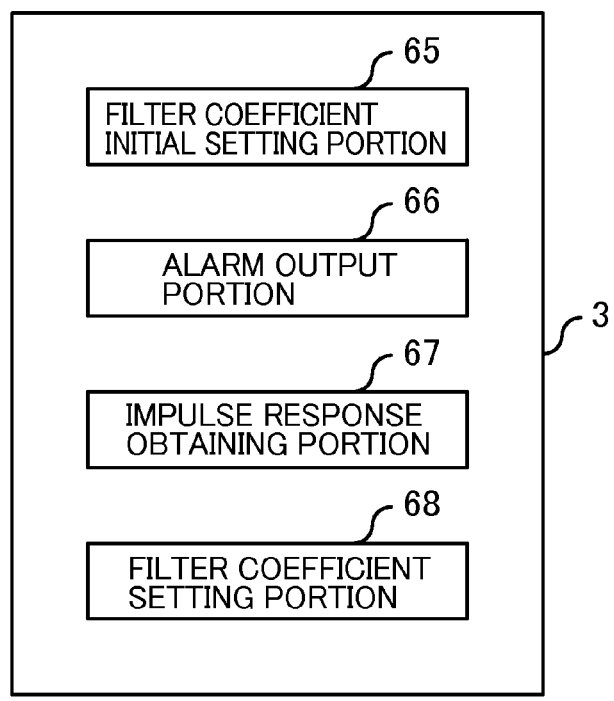
FIG. 3 is a diagram illustrating configuration of a functional block realized when a DSP core executes a program.

The DSP core 40 (processor) can execute various processing in the DSP 3 by carrying out the program stored in the RAM 41 or ROM 42. FIG. 3 is a diagram illustrating configuration of a functional block realized when the DSP core 40 executes the program. The DSP 3 comprises a filter coefficient initial setting portion 65, an alarm output portion 66, an impulse response obtaining portion 67, and a filter coefficient setting portion 68. A processor comprising the filter coefficient initial setting portion 65, the alarm output portion 66, the impulse response obtaining portion 67, and the filter coefficient setting portion 68 corresponds to a filter coefficient setting device of the present invention.

When the echo prevention device 1 is started, the filter coefficient initial setting portion 65 sets an initial value of the filter coefficient (predetermined filter coefficient) to the FIR filters 50, 51 so that the inputted digital signal is attenuated before output. In the first embodiment, suppose that all the bits in the initial value of the filter coefficient are zero. If all the bits in the filter coefficient are zero, the inputted digital signal is completely attenuated and outputted from the FIR filters 50, 51 as no sound. When data corresponding to an impulse response is stored in the impulse response memory portion 62, the filter coefficient initial setting portion 65 sets a filter coefficient based on the data corresponding to the impulse response to the FIR filters 50, 51.

The alarm output portion 66 refers to the obtained flag memory portion 61 through the CPU 25 at start of the echo prevention device 1, and if the impulse response has not been obtained, an alarm signal is outputted to the CPU 25. The CPU 25 lights the alarm lamp 28, for example, according to the alarm signal from the alarm output portion 66. The alarm notification method is not limited to lighting of the alarm lamp 28 but may be any method such as output of an alarm sound by which a user can recognize that the impulse response has not been obtained.

The impulse response obtaining portion 67 refers to the obtained flag memory portion 61 through the CPU 25 and if the impulse response has not been obtained, the impulse response is obtained. Specifically, the impulse response obtaining portion 67 outputs an impulse (first signal) from the output terminal 32 and obtains an impulse response IR1'(Z) (first response signal) of a path A indicated by a solid line in FIG. 1 from the input terminal 31. Also, the impulse response obtaining portion 67 outputs an impulse (second signal) from the output terminal 33 and obtains an impulse response IR2'(Z) (second response signal) of a path B indicated by a solid line in FIG. 1 from the input terminal 31. The impulse response obtaining portion 67 stores the obtained impulse response in the impulse response memory portion 62 through the CPU 25. The impulse response obtaining portion 67 can store not the obtained impulse response itself but data according to the impulse response in the impulse response memory portion 62. For example, the filter coefficient based on the impulse response set to the FIR filters 50, 51 may be stored in the impulse response memory portion 62.

The filter coefficient setting portion 68 sets a filter coefficient of the FIR filter 51 based on the impulse response IR1'(Z) obtained by the impulse response obtaining portion 67. Also the filter coefficient setting portion 68 sets a filter coefficient of the FIR filter based on the impulse response IR2'(Z) obtained by the impulse response obtaining portion 67.

==Principle of Echo Cancellation==

Next, a principle of echo cancellation in the echo prevention device 1 will be described. Here, an impulse response (transfer function) from the output terminal 32 to the +input terminal of the differential amplifier circuit 12 indicated by a broken line in FIG. 1 is set as IR1(Z). Also, the impulse response (transfer function) from the output terminal 33 to the − input terminal of the differential amplifier circuit 12 indicated by a broken line in FIG. 1 is set as IR2(Z). Furthermore, the impulse response (transfer function) from the rear stage of a ± input terminal to the input terminal 31 in the differential amplifier circuit 12 indicated by a broken line in FIG. 1 is set as W(Z).

At this time, the impulse response (transfer function) IR1'(Z) of the path A shown by the solid line in FIG. 1 is IR1'(Z)=IR1(Z)·W(Z). Also, the impulse response (transfer function) IR2'(Z) of the path B shown by the solid line in FIG. 1 is IR2'(Z)=−IR2(Z)·W(Z). IR2(Z) is phase-shifted since it is inputted to the − input terminal of the differential amplifier circuit 12.

Suppose that the filter coefficient of the FIR filter 50 is −IR2'(Z) obtained by phase-shifting IR2'(Z), a property I Ral1_1(Z) from the input of the FIR filter 50 to the input terminal 31 is represented by:

$$I\,Ral1\_1(Z) = -IR2'(Z) \cdot IR1'(Z)$$
$$= (-(-IR2(Z) \cdot W(Z)) \cdot (IR1(Z) \cdot W(Z))$$
$$= IR2(Z) \cdot W(Z) \cdot IR1(Z) \cdot W(Z)$$

Also, suppose that the filter coefficient of the FIR filter 51 is IR1'(Z), a property I Ral1_2(Z) from the input of the FIR filter 51 to the input terminal 31 is represented by:

$$I\,Ral1\_2(Z) = -IR1'(Z) \cdot IR2'(Z)$$
$$= IR1(Z) \cdot W(Z) \cdot (-IR2(Z) \cdot W(Z))$$
$$= IR1(Z) \cdot W(Z) \cdot (-IR2(Z)) \cdot W(Z)$$
$$= -I\,Ral1\_1(Z)$$

That is, it is known that the property I Ral1_1(Z) from the input of the FIR filter 50 to the input terminal 31 and the property I Ral1_2(Z) from the input of the FIR filter 51 to the input terminal 31 cancel each other. As a result, it is only necessary that the filter coefficient of the FIR filter 50 is set at −IR2'(Z) obtained by phase-shifting of IR2'(Z) and the filter coefficient of the FIR filter 51 at IR1'(Z).

Alternatively, suppose that the filter coefficient of the FIR filter 50 is IR2'(Z), the property I Ral1_1(Z) from the input of the FIR filter 50 to the input terminal 31 is represented by:

$$I\,Ral1\_2(Z) = IR2'(Z) \cdot IR1'(Z)$$
$$= (-IR2(Z) \cdot W(Z)) \cdot (IR1(Z) \cdot W(Z))$$
$$= -IR2(Z) \cdot W(Z) \cdot IR1(Z) \cdot W(Z)$$

Also, suppose that the filter coefficient of the FIR filter 51 is −IR1'(Z) obtained by phase-shifting of IR1'(Z), the property I Ral1_2(Z) from the input of the FIR filter 51 to the input terminal 31 is represented by:

$$I\,Ral1\_2(Z) = -IR1'(Z) \cdot IR2'(Z)$$
$$= (-(-IR1(Z) \cdot W(Z))) \cdot (-IR2(Z) \cdot W(Z))$$
$$= IR1(Z) \cdot W(Z) \cdot IR2(Z) \cdot W(Z)$$
$$= -I\,Ral1\_1(Z)$$

That is, it is known that the property I Ral1_1(Z) from the input of the FIR filter 50 to the input terminal 31 and the property I Ral1_2(Z) from the input of the FIR filter 51 to the input terminal 31 cancel each other. As a result, it is only necessary that the filter coefficient of the FIR filter 50 is set at IR2'(Z) and the filter coefficient of the FIR filter 51 at −IR1'(Z) obtained by phase-shifting IR1'(Z).

By setting the filter coefficients of the FIR filters 50, 51 based on the impulse responses IR1'(Z) and IR2'(Z) as above, a signal transferring through the path A in the differential amplifier circuit 12 can be cancelled by a signal transferring through the path B. As a result, an echo generated when a digital signal is inputted to the input terminal 30 can be prevented.

Also, as shown in FIG. 1, by obtaining the impulse response IR1'(Z) while the earphone-microphone 20 is connected and by setting the filter coefficient of the FIR filter 51 based on the IR1'(Z), effective echo prevention can be realized according to transfer characteristics of the earphone-microphone 20. Moreover, by obtaining the impulse response IR1'(Z) while the connected earphone-microphone 20 is worn by inserting it in an earhole or covering an auricle of ear with it and by setting the filter coefficient of the FIR filter 51 based on the IR1'(Z), effective echo prevention can be realized according to transfer characteristics of the earphone-microphone 20 and the transfer characteristics of the ear of a user. It is possible to obtain the impulse response IR1'(Z) while the earphone-microphone 20 is not connected and to set the filter coefficient of the FIR filter 51 based on the IR1'(Z).

==Filter Coefficient Setting Processing==

Figure 4:
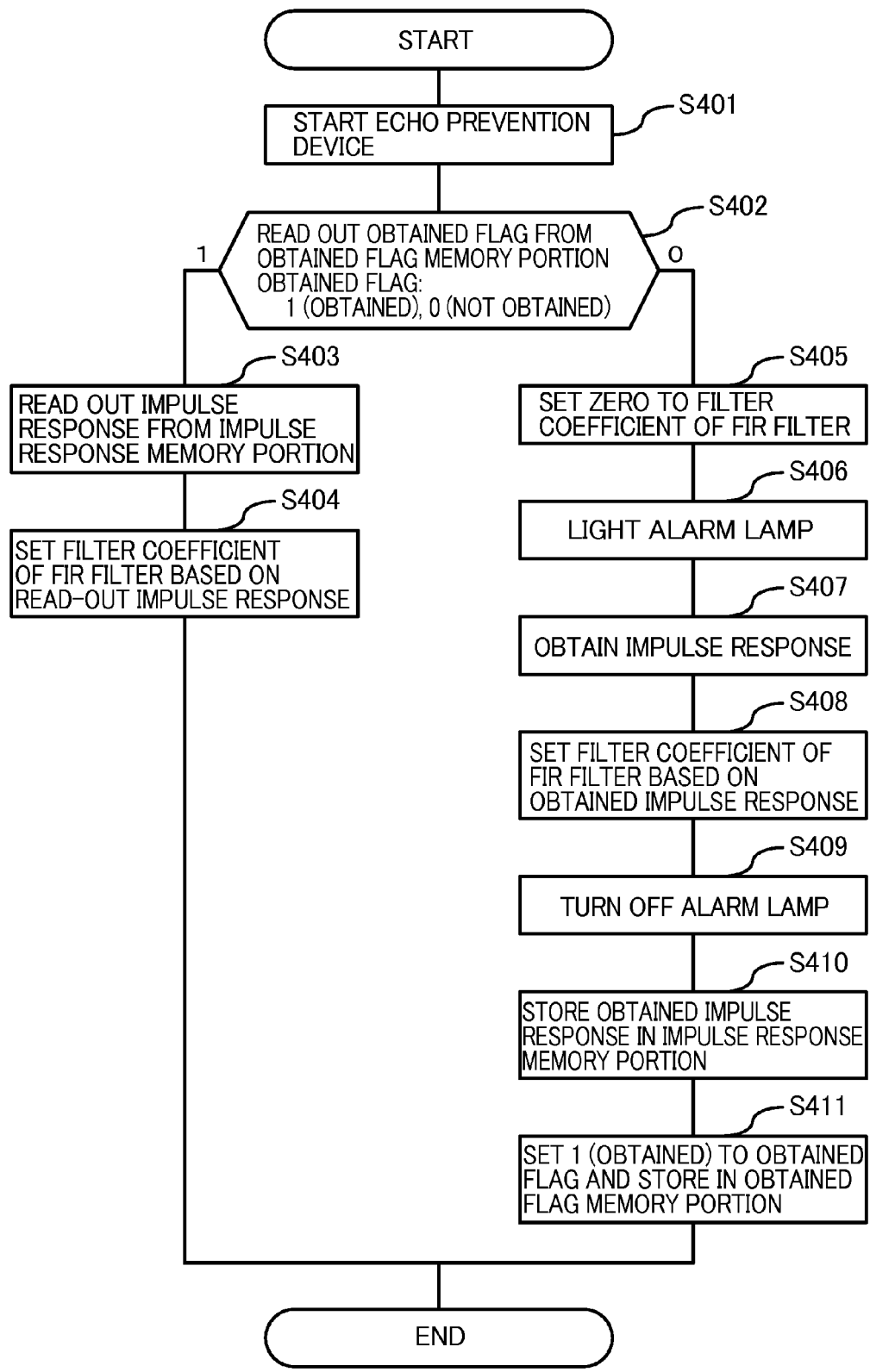
FIG. 4 is a flowchart illustrating an example of a filter coefficient setting processing.

Next, filter coefficient setting processing in the echo prevention device 1 will be described. FIG. 4 is a flowchart illustrating an example of the filter coefficient setting processing. First, when the echo prevention device 1 is started (S401), the filter coefficient initial setting portion 65 reads out an obtained flag stored in the obtained flag memory portion 61 through the CPU 25 (S402).

If the obtained flag read out of the obtained flag memory portion 61 is "1", that is, if the impulse response is stored in the impulse response memory portion 62 (S402: 1), the filter coefficient initial setting portion 65 reads out the impulse responses IR1'(Z) and IR2'(Z) stored in the impulse response memory portion 62 (S403). Then, the filter coefficient initial setting portion 65 sets the filter coefficients of the FIR filters 50, 51 based on the impulse responses IR1'(Z) and IR2'(Z) read out of the impulse response memory portion 62 (S404). Specifically, −IR2'(Z) obtained by phase-shifting of the impulse response IR2'(Z) is set to the filter coefficient of the FIR filter 50 and the impulse response IR1'(Z) is set to the filter coefficient of the FIR filter 51, for example.

If the obtained flag read out of the obtained flag memory portion 61 is "0", that is, if the impulse response is not stored in the impulse response memory portion 62 (S402: 0), the filter coefficient initial setting portion 65 sets zero as an initial value to all the bits in the filter coefficients of the FIR filters 50, 51 (S405). Moreover, the alarm output portion 66 lights the alarm lamp by outputting an alarm signal to the CPU 25 (S406).

After that, when it is notified from the CPU 25 that the learning button 27 is pressed down, the impulse response obtaining portion 67 obtains the impulse responses IR1'(Z) and IR2'(Z) (S407). And the filter coefficient setting portion 68 sets the filter coefficients of the FIR filters 50, 51 based on the impulse responses IR1'(Z) and IR2'(Z) obtained by the impulse response obtaining portion 67 (S408). Specifically, −IR2'(Z) obtained by phase-shifting of the impulse response IR2'(Z) is set to the filter coefficient of the FIR filter 50 and the impulse IR1'(Z) is set to the filter coefficient of the FIR filter 51, for example. The alarm output portion 66 turns off the alarm lamp by outputting an alarm cancellation signal indicating that the impulse response is obtained to the CPU 25 (S409).

Also, the impulse response obtaining portion 67 stores the obtained impulse responses IR1'(Z) and IR2'(Z) in the impulse response memory portion 62 through the CPU 25 (S410) and stores the obtained flag to which "1", indicating that the impulse response has been obtained, is set in the obtained flag memory portion 61 through the CPU 25 (S411).

In the first embodiment, −IR2'(Z) obtained by phase-shifting of the impulse response IR2'(Z) is set to the filter coefficient of the FIR filter 50 and the impulse responses IR1'(Z) to the filter coefficient of the FIR filter 51, but the impulse response IR2'(Z) may be set to the filter coefficient of the FIR filter 50 and −IR1'(Z) obtained by phase-shifting of the impulse response IR1'(Z) to the filter coefficient of the FIR filter 51.

The first embodiment has been described above. As mentioned above, when the echo prevention device 1 is started, the filter coefficients (predetermined filter coefficients) that attenuate and output inputted digital signals are set to the FIR filters 50, 51 by the filter coefficient initial setting portion 65, by which the signal level of an echo transmitted to the other party can be attenuated. That is, unpleasant echo transmitted to the other party can be restricted. Also, since the signal is attenuated by the FIR filter 50, sound outputted from the earphone-microphone 20 is also attenuated. Thus, the user of the earphone-microphone 20 can easily notice that the impulse response has not been obtained yet, and obtainment of the impulse response is promoted.

Moreover, as shown in the first embodiment, the filter coefficient initial setting portion 65 can set zero as an initial value to all the bits in the filter coefficients of the FIR filters 50, 51. In this case, the digital signal inputted to the FIR filters 50, 51 are fully attenuated and outputted as no sound. Therefore, the echo is not transmitted to the other party. Also, since the sound transmitted from the other party is not outputted from the earphone-microphone 20 at all, the fact that the impulse response has not been obtained yet can be easily recognized.

The filter coefficient initial setting portion 65 sets the filter coefficients of the FIR filters 50, 51 based on the impulse response read out from the impulse response memory portion 62 if the impulse response is stored in the impulse response memory portion 62 at start of the echo prevention device 1. That is, after the echo prevention device 1 is started, the appropriate filter coefficients which can restrict echo are set to the FIR filters 50, 51 based on the already-obtained impulse responses, and transmission of an unpleasant echo to the other party can be restricted.

Also, since the impulse response obtaining portion 67 stores the impulse response in the impulse response memory portion 62, at the next start of the echo prevention device 1, an appropriate filter coefficient which can restrict an echo is set to the FIR filters 50, 51, and transmission of an unpleasant echo to the other party can be restricted without obtaining an impulse response again.

Also, if the impulse response is not stored in the impulse response memory portion 62, the alarm output portion 66 outputs an alarm signal so as to light the alarm lamp 28 or the like, by which the user of the earphone-microphone 20 can recognize that the impulse response has not been obtained yet more easily.

In the first embodiment, the impulse response obtained by generating an impulse is set to the filter coefficient of the FIR filter, but the signal used for setting the filter coefficient is not limited to an impulse. For example, the filter coefficient of the FIR filter may be set based on a response signal obtained when a step signal is generated.

Second Embodiment

Entire Configuration

Figure 5:
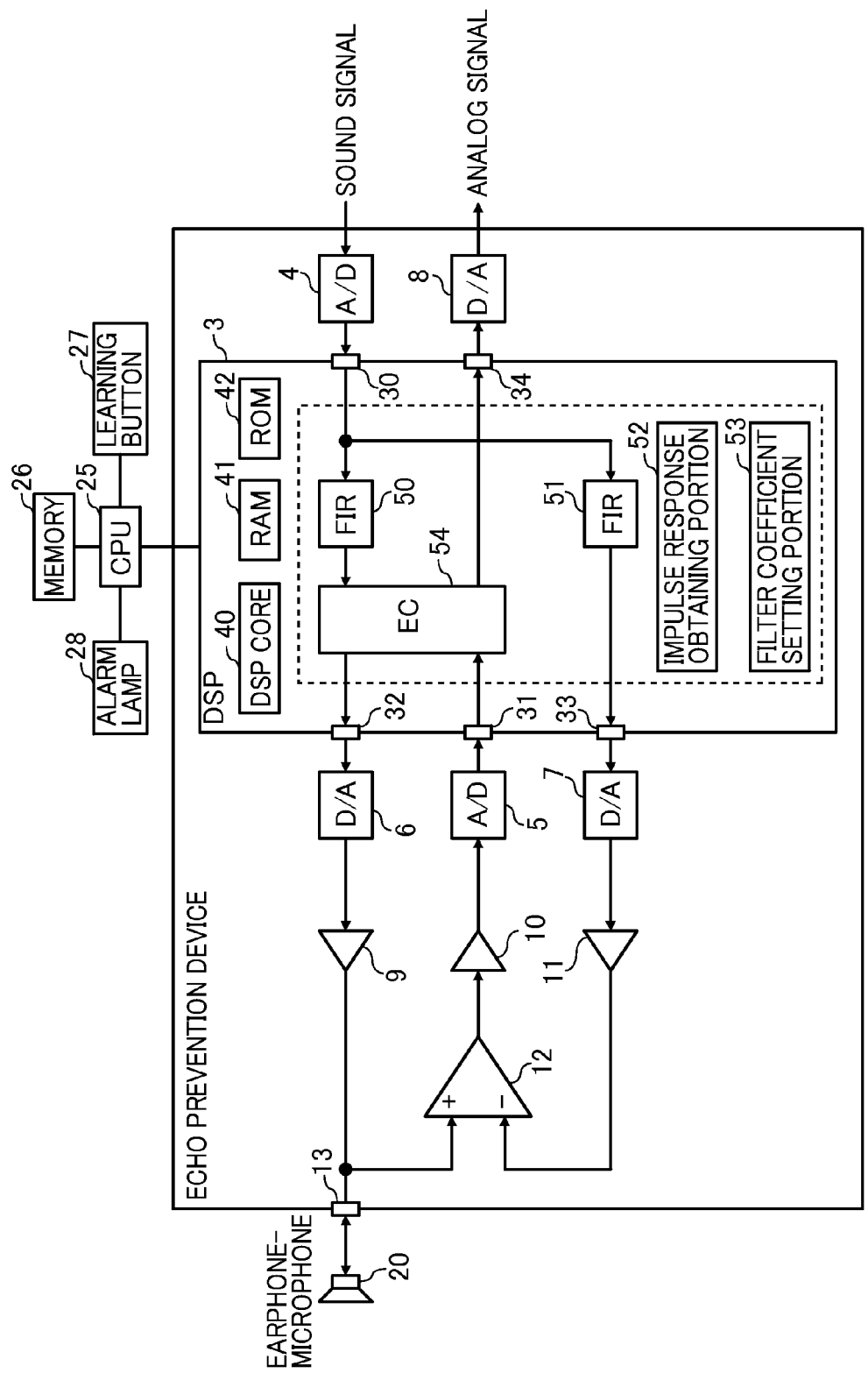
FIG. 5 is a block diagram illustrating configuration of the echo prevention device of an embodiment.

First, configuration of an echo prevention device, which is a second embodiment of the present invention, will be described. FIG. 5 is a block diagram illustrating the configuration of the echo prevention device of the second embodiment. The same reference numerals are given to the same configuration as those in the first embodiment and the description will be omitted.

When the CPU 25 detects power on for activating the echo prevention device, the CPU 25 outputs an instruction signal to execute setting processing of the filter coefficient based on an impulse response, which will be described later, to the DSP 3. Also, if a reset signal to reset the echo prevention device is inputted, for example, the CPU 25 may output the above instruction signal to the DSP 3.

The DSP 3 comprises the input terminals 30, 31, the output terminals 32 to 34, the DSP core 40, the RAM (Random Access Memory) 41, and the ROM (Read Only Memory) 42. The DSP 3 is also provided with the FIR filters 50, 51, the impulse response obtaining portion 52, the filter coefficient setting portion 53, and an echo canceller (EC) 54. The FIR filters 50, 51, the impulse response obtaining portion 52, the filter coefficient setting portion 53, and the echo canceller 54 are realized when the DSP core 40 executes a program stored in the RAM 41 or the ROM 42. The filter coefficients of the FIR filters 50, 51 are stored in the RAM 41. Here, the FIR filter 50 corresponds to the first FIR filter in the present invention and the FIR filter 51 to the second FIR filter of the present invention.

The impulse response obtaining portion 52 (signal response characteristic obtaining portion) obtains an impulse response (first signal response characteristic) from the input terminal 31 when an impulse is generated to the output of the FIR filter 50 and an impulse response (second signal response characteristic) from the input terminal 31 when an impulse is generated to the output of the FIR filter 51. The filter coefficient setting portion 53 sets the filter coefficients of the FIR filters 50, 51 based on the impulse response obtained by the impulse response obtaining portion 52 so that an output signal of the amplifier circuit 9 and a signal (echo) combined with a signal, which is an output signal of the amplifier circuit 9 reflected through the earphone-microphone 20 and returned, are removed or attenuated at the differential amplifier circuit 12 using the output signal of the amplifier circuit 11.

==Echo Canceller==

Figure 6:
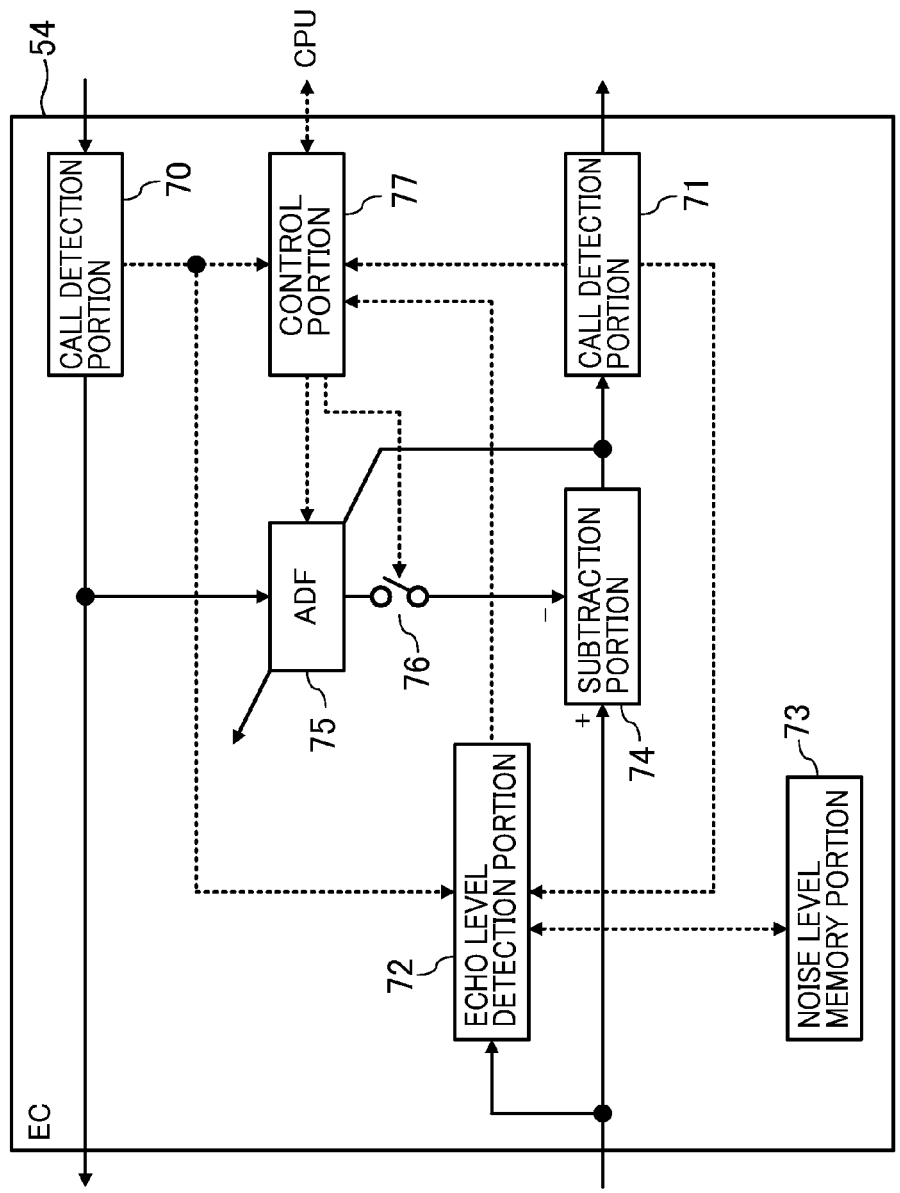
FIG. 6 is a block diagram illustrating a configuration example of an echo canceller of the embodiment.

Next, the detail of the echo canceller 54 of the second embodiment will be described. FIG. 6 is a block diagram illustrating a configuration example of the echo canceller 54 of the second embodiment. The echo canceller 54 comprises call detection portions 70, 71, an echo level detection portion 72, a noise-level memory portion 73, a subtraction portion 74, an adaptive filter 75, a switch 76, and a control portion 77. The subtraction portion 74 and the adaptive filter 75 correspond to an echo removing portion of the present invention.

To the call detection portion 70, a signal (first input signal) outputted from the FIR filter 50 is inputted. The call detection portion 70 detects if a sound signal has been transmitted from the other party based on a signal outputted from the FIR filter 50. For example, the call detection portion 70 determines that the sound signal has been transmitted from the other party if a signal level of the signal outputted from the FIR filter 50 is at a predetermined level or more, while it determines that the sound signal has not been transmitted from the other party if the signal level is less than the predetermined. The signal outputted from the FIR filter 50 is given detection processing at the call detection portion 70 and outputted to the output terminal 32.

To the call detection portion 71, a signal outputted from the subtraction portion 74 is inputted. The call detection portion 71 detects an utterance state of a wearer of the earphone-microphone 20 based on a signal outputted from the subtraction portion 74. For example, the call detection portion 71 determines that the wearer of the earphone-microphone 20 is speaking if the signal level of the signal outputted from the subtraction portion 74 is a predetermined level or more, while it determines that the wearer of the earphone-microphone 20 is not speaking if the level is less than the predetermined. The signal outputted from the subtraction portion 74 is given detection processing at the call detection portion 71 and outputted to the output terminal 34.

The echo level detection portion 72 detects the signal level of the signal inputted from the input terminal 31 while transmission/receiving of a sound signal is not carried out based on a detection results of the call detection portions 70, 71 and stores it in the noise level memory portion 73. The signal level detected in this state indicates the level of a noise generated while a call is not performed. Also, the echo level detection portion 72 detects the signal level of a signal (second input signal) inputted from the input terminal 31 while a sound signal is being transmitted from the other party and the wearer of the earphone-microphone 20 is not speaking based on the detection result of the call detection portions 70, 71. The signal level detected in this state indicates the level of the signal including the echo not fully removed at the differential amplifier circuit 12. The echo level detection portion 72 outputs a comparison result between the noise level stored in the noise level memory portion 73 and the level of the signal including the echo to the control portion 77.

In the second embodiment, the echo level detection portion 72 detects power of a signal inputted from the input terminal 31 for a predetermined period as the signal level. However, the signal level detected at the echo level detection portion 72 is not limited to the power but may be anything as long as it can indicate the level of the signal such as maximum amplitude of the predetermined period, a sum of absolute values of the amplitudes for a predetermined period or the like.

The subtraction portion 74 subtracts a signal outputted from the adaptive filter 75 from the signal inputted from the input terminal 31 and outputs it. To the adaptive filter 75, a signal outputted from the FIR filter 50 and an output signal of the subtraction portion 74 are inputted. And the adaptive filter 75 adaptively changes the filter coefficient so that the signal outputted from the subtraction portion 74 becomes at a predetermined level or less while a sound signal is being transmitted from the other party and the wearer of the earphone-microphone 20 is not speaking. The switch 76 controls if an output signal of the adaptive filter 75 is to be outputted to the subtraction portion 74 or not. As for the configuration of the adaptive filter 75 and setting operation of the filter coefficient, the configuration and operation of the adaptive filter 75 may be made equivalent to the configuration and operation of the adaptive filter disclosed in Japanese Patent Laid-Open No. 2006-304260, for example.

The control portion 77 (output control portion) has an adaptive update processing of the filter coefficient executed by the adaptive filter 75 while a sound signal is being transmitted from the other party and the wearer of the earphone-microphone 20 is not speaking based on the detection results of the call detection portions 70, 71. Also, the control portion 77 controls if echo removal is to be executed at the subtraction portion 74 based on the comparison result outputted from the echo level detection portion 72. Specifically, if the echo included in the signal inputted from the input terminal 31 while the sound signal is being transmitted from the other party and the wearer of the earphone-microphone 20 is not speaking is at a predetermined level or more, the control portion 77 turns on the switch 76 so that the echo removal is executed by the subtraction portion 74 (echo removal processing is turned on). If the echo included in the signal inputted from the input terminal 31 in the similar state is less than the predetermined level, the control portion 77 turns off the switch 76 so that the echo removal at the subtraction portion 74 is not carried out (echo removal processing is turned off). When the echo removal at the subtraction portion 74 is set not to be executed, it is possible to set all the filter coefficients of the adaptive filter 75 to zero instead of turning off the switch 76. The control portion 77 outputs an alarm signal to light the alarm lamp 28 to the CPU 25 when the echo included in the signal inputted from the input terminal 31 is extremely large based on the comparison result outputted from the echo level detection portion 72.

Figure 7:
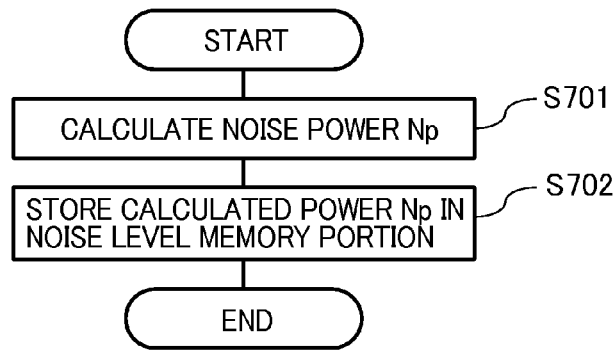
FIG. 7 is a flowchart illustrating an example of a processing for calculating power of a noise in the echo canceller of the embodiment.

Subsequently, details of on/off control of the echo removal processing at the echo canceller 54 will be described. FIG. 7 is a flowchart illustrating an example of processing for calculating noise power at the echo canceller 54 in the second embodiment. The echo level detection portion 72 calculates a noise power Np inputted from the input terminal 31 while a sound signal is not transmitted from the other party and the wearer of the earphone-microphone 20 is not speaking based on the detection result of the call detection portions 70, 71 at power on of the echo prevention device (S701). And the echo level detection portion 72 stores the calculated noise power Np in the noise level memory portion 73 (S702).

Figure 8:
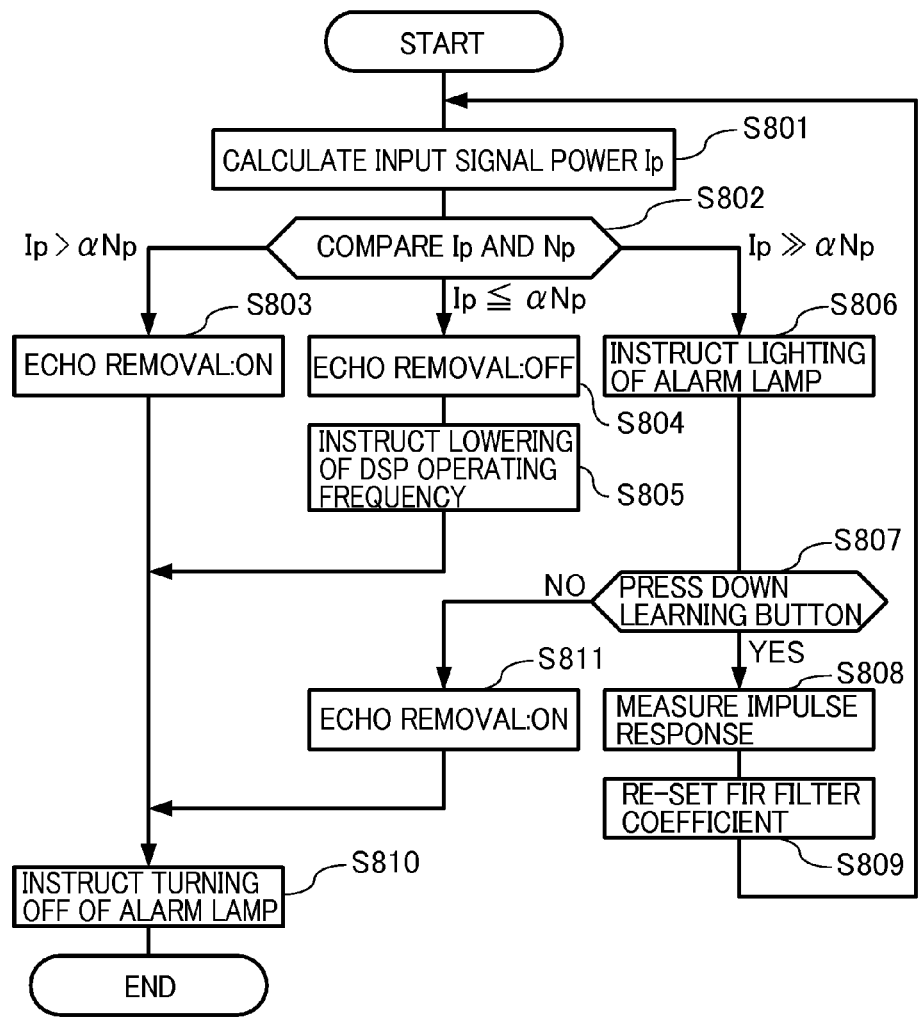
FIG. 8 is a flowchart illustrating an example of a processing for determining on/off of an echo removal processing in the echo canceller of the embodiment.

FIG. 8 is a flowchart illustrating an example of processing for determining on/off of the echo removal processing at the echo canceller 54 in the second embodiment. The echo level detection portion 72 calculates power Ip of the input signal from the input terminal 31 while a sound signal is being transmitted from the other party and the wearer of the earphone-microphone 20 is not speaking based on the detection result of the call detection portions 70, 71 (S801). And the echo level detection portion 72 compares the input signal power Ip and the noise power Np stored in the noise level memory portion 73 and outputs a signal indicating the comparison result to the control portion 77 (S802). In the second embodiment, a value obtained by multiplying the noise power Np by a coefficient $\alpha$ and the input signal power Ip are compared for their sizes. The coefficient $\alpha$ is a number larger than 1 and set at an appropriate value based on the measurement results or the like of the noise power Np and the input signal power Ip.

If the comparison result at the echo level detection portion 72 is Ip>αNp, the control portion 77 determines that an echo amount remaining in the input signal from the input terminal 31 is large and turns on the echo removal processing at the subtraction portion 74 (S803). On the other hand, if the comparison result at the echo level detection portion 72 is Ip≦αNp, the control portion 77 determines that the amount of echo remaining in the input signal from the input terminal 31 is small and the echo has been sufficiently removed at the differential amplifier circuit 12 and turns off the echo removal processing at the subtraction portion 74 (S804). When the echo removal processing is turned off by setting zero to all the filter coefficients of the adaptive filter 75, a processing amount at the DSP 3 is attenuated and the control portion 77 outputs a signal to lower an operating frequency of the DSP 3 to the CPU 25. When the echo removal processing is turned off by turning off the switch 76 while update of the filter coefficient of the adaptive filter 75 is continued, the signal to lower the operating frequency of the DSP 3 is not outputted. If the echo removal processing is turned off by stopping update of the filter coefficients and turning off the switch 76, not by setting zero to all the filter coefficients of the adaptive filter 75, the control portion 77 outputs the signal to lower the operating frequency of the DSP 3 to the CPU 25.

Moreover, if the comparison result at the echo level detection portion 72 is Ip>>αNp, the control portion 77 determines that the amount of echo remaining in the input signal from the input terminal 31 is extremely large and outputs an alarm signal to instruct lighting of the alarm lamp 28 to the CPU 25 (S806). By lighting of the alarm lamp 28, the wearer of the earphone-microphone 20 can detect that an extremely large echo is being transmitted to the other party.

After lighting of the alarm lamp 28, if the learning button 27 is pressed down by the wearer of the earphone-microphone 20 (S807: YES), the impulse response obtaining portion 52 re-obtains the impulse response (S808), and the filter coefficient setting portion 53 re-sets the filter coefficients of the FIR filters 50, 51 based on the re-obtained impulse response (S809). After the filter coefficients of the FIR filters 50, 51 are re-set, calculation of the input signal power Ip from the input terminal 31 (S801) and comparison with the noise power Np (S802) are carried out again. And the determination similar to the above is made at the control portion 77 again, and in the case of Ip>αNp, the echo removal processing is turned on (S803), while in the case of Ip≦αNp, the echo removal processing is turned off (S804). After that, the control portion 77 outputs a signal to instruct turning off of the alarm lamp 28 to the CPU 25 (S810). The control portion 77 may have the impulse response obtaining portion 52 re-obtain the impulse response and the filter coefficient setting portion 53 re-set the filter coefficients of the FIR filters 50, 51 without lighting the alarm lamp 28.

After the alarm lamp 28 is lighted, if the learning button 27 is not pressed down even if a predetermined time has elapsed (S807: NO), the control portion 77 turns on the echo removal processing at the subtraction portion 74 (S811) and instructs turning off of the alarm lamp 28 (S810).

Figure 9:
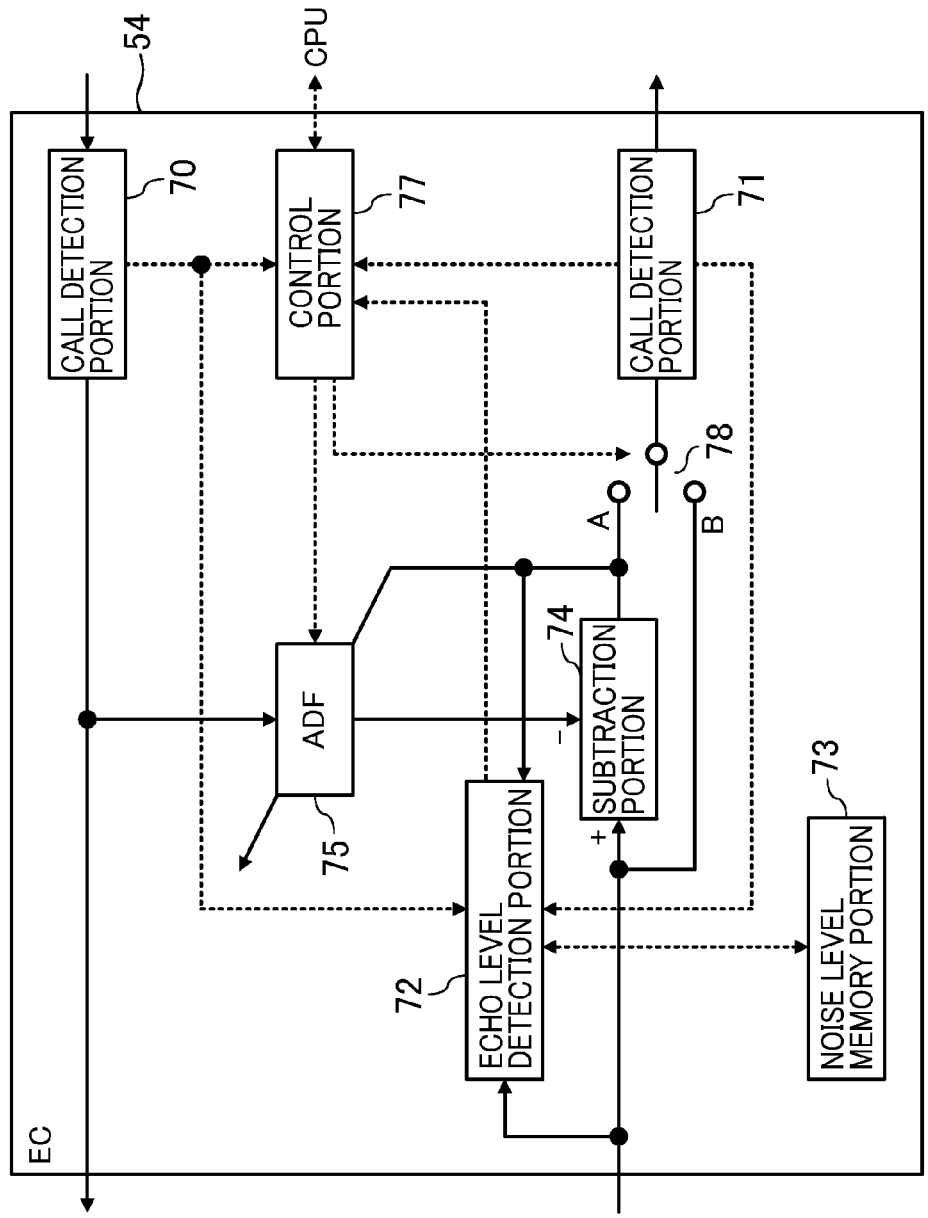
FIG. 9 is a block diagram illustrating another configuration example of the echo canceller of this embodiment.

FIG. 9 is a block diagram illustrating another configuration example of the echo canceller 54 in the second embodiment. The echo canceller 54 is provided with a switch 78 instead of the switch 76 in the configuration shown in FIG. 6.

The echo level detection portion 72 detects the signal level Ip of a signal (second input signal) inputted from the input terminal 31 while a sound signal is being transmitted from the other party and the wearer of the earphone-microphone 20 is not speaking similarly to the configuration shown in FIG. 6.

The echo level detection portion 72 detects a signal level Sp of a signal outputted from the subtraction portion 74 based on the detection result of the call detection portions 70, 71 while the sound signal is being transmitted from the other party and the wearer of the earphone-microphone 20 is not speaking. The echo level detection portion 72 outputs a comparison result between the signal level of the signal inputted from the input terminal 31 and the signal level of the signal outputted from the subtraction portion 74, that is, a signal indicating a degree of echo removal at the subtraction portion 74 to the control portion 77.

Similarly to the configuration shown in FIG. 6, the echo level detection portion 72 detects power for a predetermined period of the signal as the signal level. However, the signal level detected at the echo level detection portion 72 is not limited to the power but the level may be anything as long as the size of the signal level can be indicated such as the maximum amplitude for a predetermined period, an absolute value sum of the amplitudes for a predetermined period or the like.

The control portion 77 has the adaptive update processing of the filter coefficient executed by the adaptive filter 75 based on the detection result of the call detection portions 70, 71 while the sound signal is being transmitted from the other party and the wearer of the earphone-microphone 20 is not speaking. The control portion 77 also controls if the echo removal is to be executed or not at the subtraction portion 74 based on a degree of the echo removal outputted from the echo level detection portion 72. Specifically, while the sound signal is being transmitted from the other party and the wearer of the earphone-microphone 20 is not speaking, by switching the switch 78 to an A side if the degree of the echo removal is higher than the predetermined level (Ip>αSp), the echo in the signal inputted form the input terminal 31 is removed or attenuated at the subtraction portion 74 and outputted. Also, in the similar state, if the degree of the echo removal is lower than the predetermined level (Ip≦αSp), the control portion 77 switches the switch 78 to a B side so that the echo in the signal inputted from the input terminal 31 is not removed or attenuated at the subtraction portion 74 but outputted.

When the switch 78 is switched to the B side, the control portion 77 can stop adaptive update of the filter coefficient of the adaptive filter 75. Also, the control portion 77 can prevent the echo from being removed or attenuated at the subtraction portion 74 by setting zero to all the filter coefficients of the adaptive filter 75 while the switch 78 is kept on the A side. And when the control portion 77 stops adoptive update of the filter coefficient of the adaptive filter 75 (including the case where all the filter coefficients are set to zero), a processing amount at the DSP 3 is attenuated, and signal to lower the operating frequency of the DSP 3 is outputted to the CPU 25.

It is possible to continue adaptive update of the filter coefficient of the adaptive filter 75 when the switch 78 is switched to the B side. In this case, detection of the echo removal degree is continuously carried out at the echo level detection portion 10, and when the echo removal degree rises to a predetermined level or more, the switch 78 is switched to the A side. That is, when the echo removal degree at the subtraction portion 74 is improved, a signal indicating that the echo is removed or attenuated at the subtraction portion 74 is outputted, which enables effective echo removal.

The second embodiment has been described above. As mentioned above, in the echo prevention device of the second embodiment, if it is determined that the echo has been fully removed at the differential amplifier circuit 12 based on the signal level of the input signal from the input terminal 31 (Ip≦αNp), the echo removal processing is not carried out in the DSP3, while if it is determined that the echo removal is insufficient (Ip>αNp), the echo removal processing in the DSP 3 is carried out. As a result, if the echo removal is sufficiently carried out in the differential amplifier circuit 12, increase of the echo caused by the echo removal processing executed in the DSP 3 is restricted, and effective echo removal is realized. If the echo is not fully removed in the differential amplifier circuit 12, the echo removal processing is carried out in the DSP3, and the effective echo removal is enabled.

In the echo prevention device in the second embodiment, the echo removal processing in the DSP 3 can be disabled by stopping the adaptive update of the filter coefficient of the adaptive filter 75 and by outputting a signal inputted from the input terminal 31 to the output terminal 34. In this case, there is no need to update the filter coefficient adaptively according to the output signal of the subtraction portion 74 any more, the processing amount of the echo canceller 54 is attenuated, and power consumption can be restricted.

Also, in the echo prevention device in the second embodiment, the echo removal processing in the DSP 3 can be disabled by setting all the filter coefficients of the adaptive filter 75 to zero. In this case, it can be configured such that the echo removal processing is not carried out while the switch 76 is kept on.

Moreover, if the adaptive update of the filter coefficient of the adaptive filter 75 is to be stopped, by lowering the operating frequency of the DSP3 according to the reduction of the processing amount, the power consumption can be further restricted. Also, in the echo prevention device in the second embodiment, the echo removal processing can be turned off in the DSP 3 by turning off the switch 76 while the update processing of the filter coefficient in the adaptive filter 75 is continued. In this case, since the update processing of the filter coefficient of the adaptive filter 75 is continued, effective echo removal can be realized immediately after the switch 76 is switched from off to on. Also, in the echo prevention device in the second embodiment, if the echo removal degree at the subtraction portion 74 is higher than the predetermined level (Ip>αSp) based on the signal level of the input signal from the input terminal 31 and the signal level of the signal outputted from the subtraction portion 74, the signal in which the echo is removed or attenuated at the subtraction portion 74 is outputted, while if the echo removal degree is lower than the predetermined level (Ip≦αSp), the input signal from the input terminal 31 is outputted as it is. That is, only if there is some advantage in the echo removal processing in the DSP 3, the echo removal processing in the DSP 3 is validated, and effective echo removal is enabled.

In the echo prevention device in the second embodiment, if the echo removal level in the subtraction portion 74 is lower than the predetermined level, by stopping adaptive update of the filter coefficient of the adaptive filter 75 and by switching the switch 78 to the B side, the echo removal processing in the DSP 3 can be disabled. In this case, it is not necessary to adaptively update the filter coefficient according to the output signal of the subtraction portion 74 any more, the processing amount of the echo canceller 54 is attenuated and power consumption can be suppressed.

Also, in the echo prevention device in the second embodiment, if the echo removal level in the subtraction portion 74 is lower than the predetermined level, by setting all the filter coefficients of the adaptive filter 75 to zero, the echo removal processing in the DSP 3 can be disabled. In this case, the echo removal processing in the DSP 3 can be disabled while the switch 78 is kept on the A side.

Moreover, if the echo removal degree in the subtraction portion 74 is lower than the predetermined level and the adaptive update of the filter coefficient of the adaptive filter 75 is stopped, power consumption can be further suppressed by lowering the operating frequency of the DSP 3 according to the reduction of the processing amount.

Also, in the echo prevention device in the second embodiment, if the echo removal level in the subtraction portion 74 is lower than the predetermined level, while the update processing of the filter coefficient of the adaptive filter 75 is continued, the echo removal processing in the DSP 3 can be turned off by switching the switch 78 to the B side. In this case, since the update processing of the filter coefficient of the adaptive filter 75 is continued, when the echo removal degree in the subtraction portion 74 is improved, a signal whose echo is removed or attenuated is outputted at the subtraction portion 74, and the echo can be effectively removed.

Also, in the echo prevention device in the second embodiment, if the echo included in the input signal from the input terminal 31 is extremely large (IP>>αNp), the impulse response is re-obtained and the filter coefficients of the FIR filters 50, 51 are re-set. That is, if accuracy of the obtained impulse response is poor due to an influence of a noise or the like and the echo can not be effectively removed, the effective echo removal is enabled by re-obtaining of the impulse response and re-setting of the filter coefficients.

Also, in the echo prevention device in the second embodiment, if the echo included in the input signal from the input terminal 31 is extremely large (IP>>αNp), the alarm lamp 28 can be lighted. By this operation, the wearer of the earphone-microphone 20 can notice that an extremely large echo is being transmitted to the other party, and re-obtaining of the impulse response by pressing down on the learning button 27 or the like or re-setting of the filter coefficients of the FIR filters 50, 51 can be prompted. Means to have the wearer of the earphone-microphone 20 detect that the extremely large echo has been generated is not limited to the lighting of the alarm lamp 28. For example, the alarm lamp 28 may be changed from the lighted state to the flash state or the lighted color of the alarm lamp 28 may be changed. Alternatively, an alarm sound may be outputted.

Third Embodiment

Entire Configuration

Figure 10:
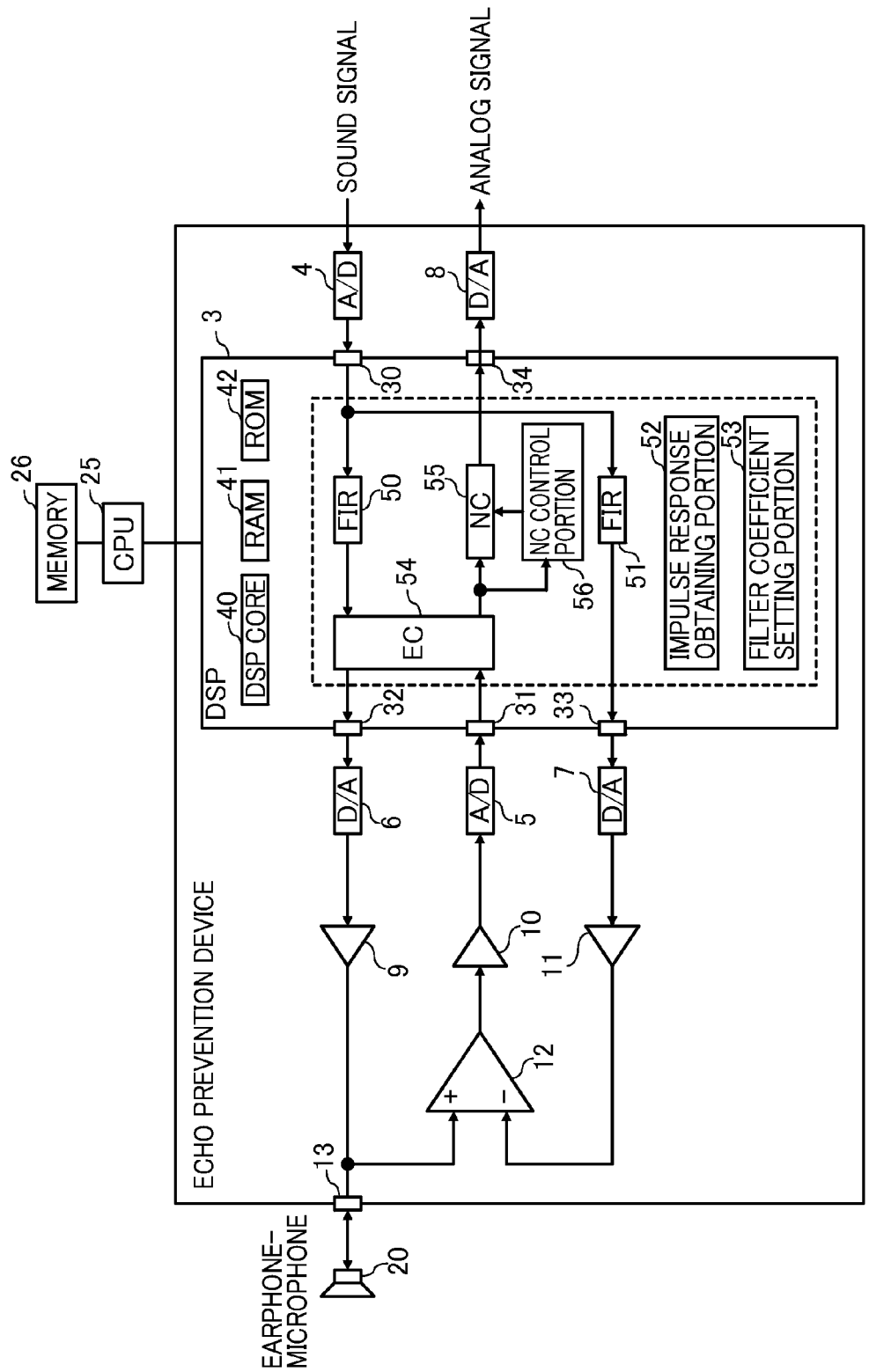
FIG. 10 is a block diagram illustrating configuration of the echo prevention device of the embodiment.

Configuration of the echo prevention device, which is an embodiment of the present invention, will be described, first. FIG. 10 is a block diagram illustrating configuration of the echo prevention device of a third embodiment. The same reference numerals are given to the same configuration in the first and second embodiments, and the description will be omitted.

The DSP 3 comprises the input terminals 30, 31, the output terminals 32 to 34, the DSP core 40, the RAM (Random Access Memory) 41, and the ROM (Read Only Memory) 42. The DSP3 comprises the FIR filters 50, 51, the impulse response obtaining portion 52, the filter coefficient setting portion 53, the echo canceller (EC) 54, the noise canceller (NC) 55, and a noise canceller control portion (NC control portions) 56. The FIR filters 50, 51, the impulse response obtaining portion 52, the filter coefficient setting portion 53, the echo canceller 54, the noise canceller 55, and a noise canceller control portion 56 are realized by having the program stored in the RAM 41 or the ROM 42 executed by the DSP core 40. The filter coefficients of the FIR filters 50, 51 are stored in the RAM 41.

The noise canceller 55 (noise removing portion) applies noise removing processing to a signal outputted from the echo canceller 54 and outputs it. The noise canceller 55 may be configured using a method disclosed in "Y. Ephraim, D. Malah, "Speech enhancement using a minimum mean-square error short-time spectral amplitude estimator" IEEE Trans, on ASSP. vol. ASSP-32, No. 6, pp. 1109-1121, 1984"", for example. In the noise removing processing of the noise canceller 55, the input signal is accumulated in a predetermined amount, for example, a signal-noise ratio to the accumulated data is calculated for each frequency band, the noise suppression coefficient is determined based on the signal-noise ratio, and by multiplying this coefficient with an amplitude component of an input signal spectrum on the frequency region, the noise is removed. The noise removing processing in the noise canceller 55 can be turned on/off by control of an NC control portion 56, and if the noise removing processing is off, a signal outputted from the echo canceller 54 is outputted to the output terminal 34 without delay.

The NC control portion 56 (output control portion) controls on/off of the noise removing processing in the noise canceller 55 according to the signal level of the echo remaining in the signal outputted from the echo canceller 54. For example, when the signal level of the echo remaining in the signal outputted from the echo canceller 54 is at a predetermined level or more, if the echo is delayed by the noise canceller 55 and transmitted to the other party, a talker on the other party might feel a sense of discomfort. Thus, in this case, the noise canceller control portion 56 turns off the noise removing processing at the noise canceller 55 so as to output the signal outputted from the echo canceller 54 without delay to the output terminal 34. On the contrary, if the signal level of the echo remaining in the signal outputted from the echo canceller 54 is less than the predetermined level, even if the echo with delay by the noise canceller 55 is transmitted to the other party, there is a good possibility that the talker on the other party does not have the sense of discomfort. Thus, in this case, the noise canceller control portion 56 turns on the noise removing processing at the noise canceller 55 so as to output a signal obtained by applying the noise removing processing to the signal outputted from the echo canceller 54 to the output terminal 34.

==On/Off Control of Noise Canceller==

Figure 11:
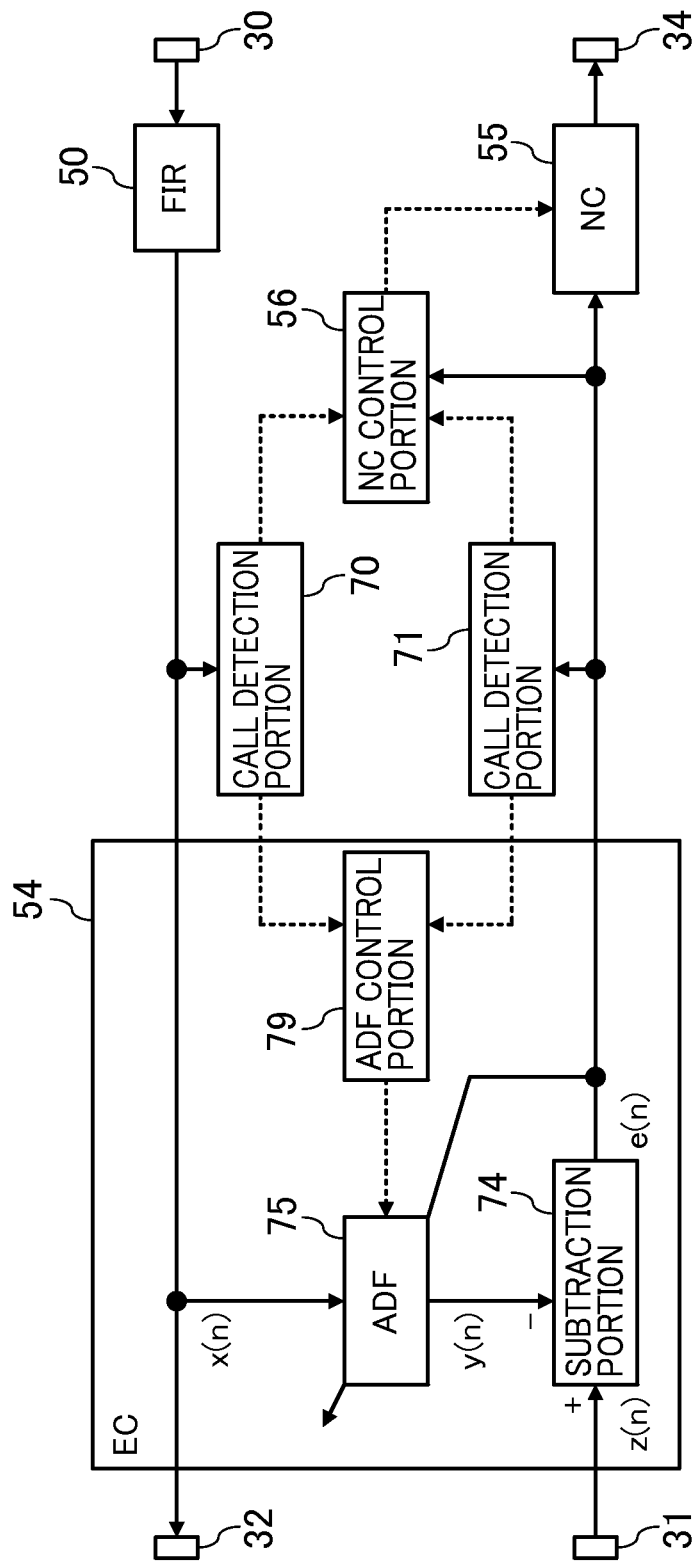
FIG. 11 is a block diagram illustrating an example of peripheral configuration of a noise canceller of the embodiment.

Next, details of the on/off control of the noise canceller 55 in the third embodiment will be described. FIG. 11 is a block diagram illustrating an example of peripheral configuration of the noise canceller 55 in the third embodiment. The echo canceller 54 comprises a subtraction portion 74, an adaptive filter (ADF: Adaptive Digital Filter) 75, and an adaptive filter control portion (ADF control portion) 79. The DSP 3 further comprises call detection portions 70, 71.

To the call detection portion 70, a signal outputted from the FIR filter 50 is inputted. The call detection portion 70 detects if a sound signal has been transmitted from the other party based on a signal outputted from the FIR filter 50. For example, the call detection portion 70 determines that the sound signal has been transmitted from the other party if the signal level of the signal outputted from the FIR filter 50 is at a predetermined level or more, while it determines that the sound signal has not been transmitted from the other party if the level is less than predetermined. Also, the signal outputted from the FIR filter 50 is given detection processing at the call detection portion 70 and outputted to the output terminal 32.

To the call detection portion 71, a signal outputted from the subtraction portion 74 is inputted. The call detection portion 71 detects a call state of the wearer of the earphone-microphone 20 based on a signal outputted from the subtraction portion 74. For example, the call detection portion 71 determines that the wearer of the earphone-microphone 20 is speaking if the signal level of the signal outputted from the subtraction portion 74 is at a predetermined level or more, while it determines that the wearer of the earphone-microphone 20 is not speaking if the level is less than predetermined. Also, the signal outputted from the subtraction portion 74 is given the detection processing at the call detection portion 71 and outputted to the noise canceller 55.

The subtraction portion 74 outputs a signal e(n) (removal error signal) obtained by subtracting a signal y(n) (pseudo echo signal) outputted from the adaptive filter 75 from a signal z(n) (echo signal: second input signal) including an echo inputted from the input terminal 31.

To the adaptive filter 75, a signal x(n) (reference signal: first input signal) outputted from the FIR filter 50 and the output signal e(n) of the subtraction portion 74 are inputted. And a sound signal has been transmitted from the other party to the adaptive filter 75, and while the wearer of the earphone-microphone 20 is not speaking, the filter coefficient is adaptively changed so that the signal e(n) outputted from the subtraction portion 74 becomes a predetermined level or less. The configuration of the adaptive filter 75 and setting operation of the filter coefficient may be equivalent to the configuration and operation of the adaptive filter disclosed in Japanese Patent Laid-Open No. 2006-304260, for example.

The ADF control portion 79 has the adaptive filter 75 execute adaptive update processing of the filter coefficient based on the detection results of the call detection portions 70, 71 while a sound signal is transmitted from the other party and the wearer of the earphone-microphone 20 is not speaking.

The NC control portion 56 detects the signal level of the signal e(n) outputted from the subtraction portion 74 based on the detection results of the call detection portions 70, 71 while the sound signal is transmitted from the other party and the wearer of the earphone-microphone 20 is not speaking. The signal level of the signal e(n) detected in this state indicates the level of the echo that has not been removed by the echo canceller 54 but remains (attenuated echo). If the signal level of the signal e(n) is at a predetermined level or more, the NC control portion 56 turns off the noise cancellation processing at the noise canceller 55, while if the signal level of the signal e(n) is less than the predetermined level, the NC control portion 56 turns on the noise cancellation processing at the noise canceller 55. Here, if the signal level of the signal e(n) is less than the predetermined level, a case is included that the echo has been completely removed and the signal level of the signal e(n) is zero. It is only necessary that the signal level of the detected signal e(n) can indicate the level of the signal e(n) such as power in a predetermined period, the maximum amplitude in the predetermined period, a sum of absolute values of the amplitudes in the predetermined period or the like.

Figure 12:
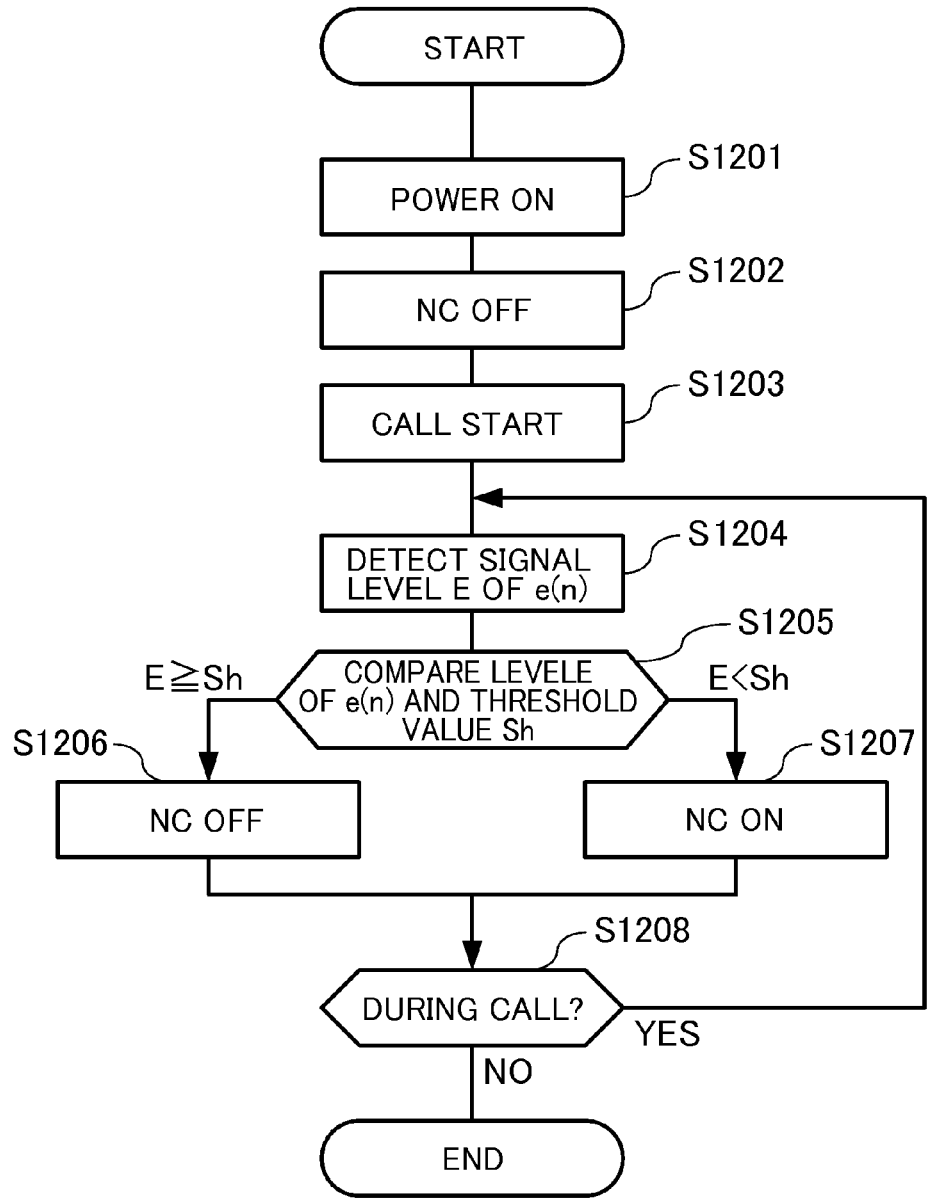
FIG. 12 is a flowchart illustrating an example of a processing for controlling on/off of the noise canceller in the embodiment.
Figure 13:
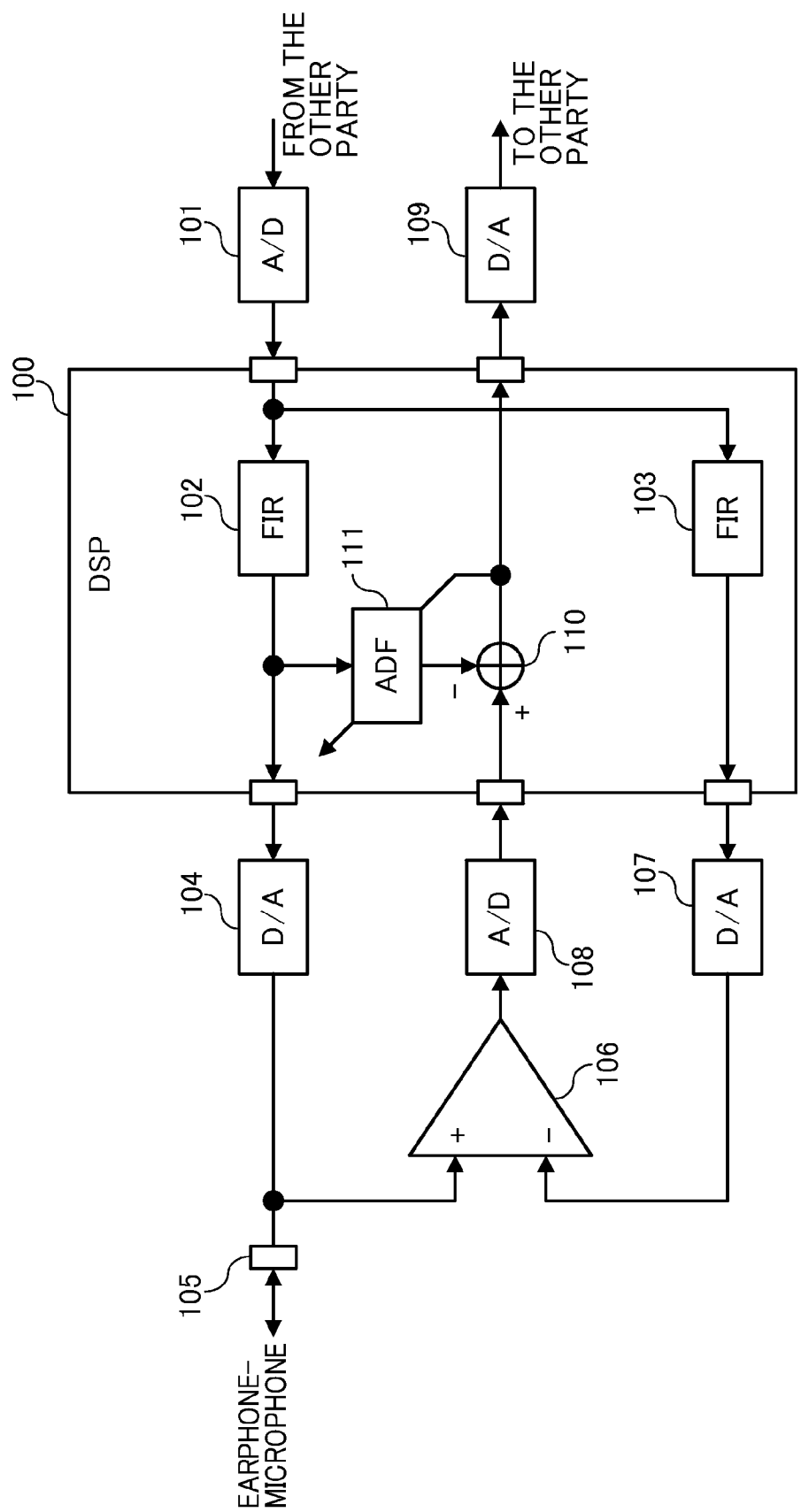
FIG. 13 is a diagram illustrating an example of the echo prevention device using a DSP.

FIG. 12 is a flowchart illustrating an example of processing of on/off control of the noise canceller 55 in the third embodiment. First, when power is turned on and the echo prevention device is started (S1201), the NC control portion 56 turns off the noise cancellation processing at the noise canceller 55. After that, the wearer of the earphone-microphone 20 and the other party start call (S1203). Immediately after start of the echo prevention device, adaptive update processing of the filter coefficient at the adaptive filter 75 has not been completed, and the signal e(n) outputted from the echo canceller 54 includes some extent of echo in many cases. Thus, by turning off the noise canceller 55 immediately after start of the echo prevention device, the echo delayed by the noise cancellation processing is not transmitted to the other party, but the sense of discomfort caused by delayed echo can be suppressed.

After the call is started, the NC control portion 56 detects a signal level E of the signal e(n) outputted from the echo canceller 54 (S1204) based on the detection results of the call detection portions 70, 71 while the sound signal is transmitted from the other party and the wearer of the earphone-microphone 20 is not speaking. The NC control portion 56 compares the detected signal level E and a threshold value Sh indicating the predetermined level (S1205).

If the signal level E of the signal e(n) is at a threshold value Sh or more (S1205: E≧Sh), the NC control portion 56 turns off the noise cancellation processing at the noise canceller 55 (S1206). That is, if the signal e(n) outputted from the echo canceller 54 includes some extent of echo, by turning off the noise canceller 55, the echo delayed by the noise cancellation processing is not transmitted to the other party and the sense of discomfort by the delayed echo can be suppressed.

If the signal level E of the signal e(n) is less than the threshold value Sh (S1205: E<Sh), the NC control portion 56 turns on the noise cancellation processing at the noise canceller 55 (S1207). That is, if the echo included in the signal e(n) outputted from the echo canceller 54 is extremely small, by turning on the noise canceller 55, a clear signal from which the noise has been removed is transmitted to the other side. In this state, the echo included in the signal e(n) is extremely small, and even if the echo delayed by the noise cancellation processing at the noise canceller 55 is transmitted to the other party, there is little possibility that the other party has a sense of discomfort.

The NC control portion 56 checks if the call is continued between the wearer of the earphone-microphone 20 and the other party based on the detection result of the call detection portions 70, 71 (S1208). If during call (S1208: YES), the NC control portion 56 repeatedly executes the on/off processing of the noise canceller 55 (S1204 to S1207) based on the signal level of the signal e(n). When the call is finished (S1208: NO), the processing is finished. When the filter coefficient of the adaptive filter 75 is updated to be an optimal value and the signal level of the signal e(n) becomes less than the threshold value Sh once, the noise canceller 55 is kept on so that on/off switching of the noise canceller 55 is not performed after that.

The third embodiment has been described. As mentioned above, in the echo prevention device in the third embodiment, if the signal level of the echo included in the signal e(n) outputted from the echo canceller 54 is at a predetermined level or more, the signal outputted from the echo canceller 55 is outputted without noise cancellation processing at the noise canceller 55. On the other hand, if the signal level of the echo included in the signal e(n) outputted from the echo canceller 54 is less than the predetermined level, the signal outputted from the echo canceller 55 is outputted after the noise cancellation processing at the noise canceller 55. That is, if the signal level of the echo included in the signal e(n) is large to an extent that the talker on the other side feels discomfort if the echo is transmitted with delay, the sense of discomfort by the echo can be decreased by preventing the delay by the noise cancellation processing from occurring. On the other hand, if the signal level of the echo included in the signal e(n) is small to an extent that the talker on the other side does not have a sense of discomfort even if the echo is transmitted with delay, the signal transmitted to the other party can be made clearer by the noise cancellation processing.

In the echo prevention device in the third embodiment, the echo canceller 54 is configured using the adaptive filter 75 that gradually decreases the echo by adaptively changing the filter coefficient. Thus, it takes some time from when the echo prevention device is started till the filter coefficient of the adaptive filter 75 is updated to an appropriate value. Therefore, turning on/off of the noise cancellation processing according to the signal level of the echo included in the signal e(n) outputted from the echo canceller 54 is particularly effective.

Moreover, in the echo prevention device in the third embodiment, the noise cancellation processing at the noise canceller 54 is turned off at start by power-on. That is, since the filter coefficient of the adaptive filter 75 has not been updated to an appropriate value at start of the echo prevention device, by turning off the noise cancellation processing, transmission of echo causing the sense of discomfort to the speaker on the other side can be suppressed.

The above embodiments of the present invention are simply for facilitating the understanding of the present invention and are not in any way to be construed as limiting the present invention. The present invention may variously be changed or altered without departing from its spirit and encompass equivalents thereof.

For example, in the first to third embodiments, the impulse response obtained by generating an impulse is set to the filter coefficient of the FIR filter, but the signal used for setting of the filter coefficient is not limited to the impulse. For example, the filter coefficient of the FIR filter may be set based on a response signal obtained when a step signal is generated.

Also, in the first to third embodiments, the echo prevention device used with the earphone-microphone 20 has been described, but the echo prevention device is not limited to the earphone-microphone 20 but can be applied to any device that echo is sent back to the other party by a sound signal transmitted from the other party. For example, if a telephone is used in the hands-free mode, in configuration that sound outputted from a speaker of the telephone is inputted from a mike of the telephone, which transmits echo to the other party, the echo prevention device can be applied.

It is claimed:

1. An echo prevention device comprising:
    an echo removing portion configured to be inputted with a first input signal and a second input signal including echo by the first input signal, and to output a signal obtained by removing or attenuating the echo included in the second input signal based on the first input signal;
    a noise removing portion configured to output a signal obtained by removing or attenuating noise included in the signal outputted from the echo removing portion; and
    a first output control portion configured to turn off noise removing processing at the noise removing portion so as to output the signal outputted from the echo removing portion as an output signal if a first signal level of echo included in the signal outputted from the echo removing portion is at a predetermined level or more, and to turn on the noise removing processing so as to output the signal outputted from the noise removing portion as an output signal if the first signal level is less than the predetermined level.

2. The echo prevention device according to claim 1, further comprising:
    an echo level detection portion configured to detect a second signal level of the echo included in the second input signal; and
    a second output control portion configured to output the signal outputted from the echo removing portion if the second signal level is a predetermined level or more, and to output the second input signal if the second signal level is less than the predetermined level, based on the second signal level of the echo detected by the echo level detection portion.

3. The echo prevention device according to claim 2, wherein the echo removing portion further includes:
- an adaptive filter configured to be inputted with the first input signal; and
- a subtraction portion configured to subtract an output signal of the adaptive filter from the second input signal to be output, and wherein
- the adaptive filter is further configured to adaptively update a filter coefficient thereof, in order that an output signal of the subtraction portion is a signal obtained by removing or attenuating the echo included in the second input signal, based on the first input signal and the output signal of the subtraction portion, and wherein
- the second output control portion is further configured to stop the adaptive update of the filter coefficient of the adaptive filter, and to output the second input signal, if the second signal level of the echo is less than the predetermined level.

4. The echo prevention device according to claim 3, wherein
- the second output control portion is further configured to output the output signal of the subtraction portion as the second input signal, by setting the filter coefficient of the adaptive filter at zero, if the second signal level of the echo is less than the predetermined level.

5. The echo prevention device according to claim 3, wherein
- the second output control portion is further configured to stop the adaptive update of the filter coefficient of the adaptive filter, and to lower an operating frequency of the echo prevention device, if the second signal level of the echo is less than the predetermined level.

6. The echo prevention device according to claim 2, wherein
- the echo removing portion further includes:
- an adaptive filter configured to be inputted with the first input signal; and
- a subtraction portion configured to subtract an output signal of the adaptive filter from the second input signal, wherein
- the adaptive filter is further configured to adaptively update a filter coefficient thereof, in order that an output signal of the subtraction portion is a signal obtained by removing or attenuating the echo included in the second input signal, based on the first input signal and the output signal of the subtraction portion, and wherein
- the second output control portion is further configured to make the adaptive filter adaptively update the filter coefficient, and to output the second input signal, if the second signal level of the echo is less than the predetermined level.

7. The echo prevention device according to claim 2, wherein:
- the echo level detection portion is further configured to further detect the first signal level; and
- the second output control portion is further configured to output the signal outputted from the echo removing portion if a degree of echo removal or attenuation at the echo removing portion is at a predetermined level or more, and to output the second input signal if the degree is less than the predetermined level, based on the second signal level of the echo included in the second input signal and the first signal level.

8. The echo prevention device according to claim 7, wherein
- the echo removing portion further includes:
- an adaptive filter configured to be inputted with the first input signal; and
- a subtraction portion configured to subtract an output signal of the adaptive filter from the second input signal to be output, and wherein
- the adaptive filter is further configured to adaptively update a filter coefficient thereof, in order that an output signal of the subtraction portion is a signal obtained by removing or attenuating the echo included in the second input signal, based on the first input signal and the output signal of the subtraction portion, and wherein
- the second output control portion is further configured to stop the adaptive update of the filter coefficient of the adaptive filter, and to output the second input signal, if the degree of echo removal or attenuation at the echo removing portion is less than the predetermined level.

9. The echo prevention device according to claim 2, further comprising:
- a first FIR filter configured to be inputted with a third input signal and to output the first input signal;
- a second FIR filter configured to be inputted with the third input signal and to output the first output signal;
- a signal response characteristic obtaining portion configured to obtain a first signal response characteristic from output of the first FIR filter to input of the second input signal at the echo removing portion and a second signal response characteristic from output of the second FIR filter to input of the second input signal at the echo removing portion; and
- a filter coefficient setting portion configured to set filter coefficients of the first and second FIR filters, in order that an output signal of a subtracting device configured to subtract the first output signal from the first input signal is the second input signal obtained by attenuating echo by the first input signal, based on the first and second signal response characteristics obtained by the signal response characteristics obtaining portion, wherein
- the second output control portion is further configured to output an alarm signal for prompting re-setting of the filter coefficients of the first and second FIR filters by obtaining the first and second signal response characteristics again, if the second signal level of the echo is at a predetermined level or more.

10. The echo prevention device according to claim 1, wherein
- the echo removing portion further includes:
- an adaptive filter configured to be inputted with the first input signal; and
- a subtraction portion configured to subtract an output signal of the adaptive filter from the second input signal to be output, and wherein
- the adaptive filter is further configured to adaptively update a filter coefficient thereof, in order that an output signal of the subtraction portion is a signal obtained by removing or attenuating the echo included in the second input signal, based on the first input signal and the output signal of the subtraction portion.

11. The echo prevention device according to claim 10, wherein
- the first output control portion is further configured to output the signal outputted from the echo removing portion as the output signal when the echo prevention device is started.

* * * * *